United States Patent
Kaneko et al.

(10) Patent No.: US 12,131,253 B2
(45) Date of Patent: Oct. 29, 2024

(54) SIGNAL GENERATION DEVICE, SIGNAL GENERATION LEARNING DEVICE, METHOD, AND PROGRAM

(71) Applicant: NIPPON TELEGRAPH AND TELEPHONE CORPORATION, Tokyo (JP)

(72) Inventors: Takuhiro Kaneko, Atsugi (JP); Kaoru Hiramatsu, Atsugi (JP); Kunio Kashino, Atsugi (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 876 days.

(21) Appl. No.: 16/609,667

(22) PCT Filed: May 1, 2018

(86) PCT No.: PCT/JP2018/017409
§ 371 (c)(1),
(2) Date: Oct. 30, 2019

(87) PCT Pub. No.: WO2018/203550
PCT Pub. Date: Nov. 8, 2018

(65) Prior Publication Data
US 2020/0151561 A1    May 14, 2020

(30) Foreign Application Priority Data

May 2, 2017 (JP) .................................. 2017-091742

(51) Int. Cl.
*G06N 3/08* (2023.01)
*G06N 3/045* (2023.01)
(Continued)

(52) U.S. Cl.
CPC ............... *G06N 3/08* (2013.01); *G06N 3/045* (2023.01); *G06N 20/20* (2019.01); *G06T 7/00* (2013.01); *G06T 11/00* (2013.01); *G06N 3/047* (2023.01)

(58) Field of Classification Search
CPC ........ G06N 3/08; G06N 3/0454; G06N 20/20; G06N 3/0472; G06N 3/045; G06N 3/047; G06T 11/00; G06T 7/00
See application file for complete search history.

(56) References Cited

U.S. PATENT DOCUMENTS

| | | | | |
|---|---|---|---|---|
| 9,754,221 B1* | 9/2017 | Nagaraja | ............... | G06N 3/0454 |
| 10,824,942 B1* | 11/2020 | Bhotika | .................. | G06F 16/56 |
| 2017/0230675 A1* | 8/2017 | Wierstra | ................. | G06T 9/002 |

OTHER PUBLICATIONS

Chen, X., Duan, Y., Houthooft, R., Schulman, J., Sutskever, I., Abbeel, P, "InfoGAN: Interpretable Representation Learning by Information Maximizing Generative Adversarial Nets," arXiv, 2016, pp. 1-14, https://arxiv.org/abs/1606.03657v1. (Year: 2016).*

(Continued)

*Primary Examiner* — Siamak Harandi
*Assistant Examiner* — Daniella M. DiGuglielmo
(74) *Attorney, Agent, or Firm* — Harness, Dickey & Pierce, P.L.C.

(57) ABSTRACT

A signal generation device includes a variable generation unit and a signal generation unit. The variable generation unit generates a plurality of latent variables corresponding to a plurality of features of a signal. The signal generation unit inputs, to at least one neural network learned in advance, a latent variable representing attributes obtained by converting a part of the plurality of latent variables by an attribute vector representing attributes of a signal to be generated and the other part of the plurality of latent variables representing an identity and generates the signal to be generated using the at least one neural network.

16 Claims, 11 Drawing Sheets

(51) Int. Cl.
  *G06N 3/047* (2023.01)
  *G06N 20/20* (2019.01)
  *G06T 7/00* (2017.01)
  *G06T 11/00* (2006.01)

(56) References Cited

OTHER PUBLICATIONS

Mirza, M., "Conditional Generative Adversarial Nets," arXiv, 2014, pp. 1-7, https://arxiv.org/abs/1411.1784v1. (Year: 2014).*
Gauthier, J., "Conditional generative adversarial nets for convolutional face generation," 2016, pp. 1-9. (Year: 2016).*
Li et al., "Deep Identity-aware Transfer of Facial Attributes," ArXiv:1610.05586v1, p. 1-13, Oct. 2016. (Year: 2016).*
Li et al., "Convolutional Network for Attribute-driven and Identity-preserving Human Face Generation," ArXiv:1608.06434v1, p. 1-9, Aug. 2016. (Year: 2016).*
Goodfellow, Ian J. et al., "Generative Adversarial Nets", NIPS 2014.
Mirza, Mehdi et al., "Conditional Generative Adversarial Nets", ArXiv:1411.1784v1, Nov. 2014.
Chen, Xi et al. "InfoGAN: Interpretable Representation Learning by Information Maximizing Generative Adversarial Nets", [online], Jun. 12, 2016, pp. 1-9, [retrieval date Jul. 4, 2018], internet:<URL:https://arxiv.org/abs/1606.03657>.
International Search Report regarding PCT/JP2018/017409, dated Jul. 17, 2018. ISA/JP.

\* cited by examiner

Glasses

Bangs

Smiling

SIGNAL GENERATION DEVICE, SIGNAL GENERATION LEARNING DEVICE, METHOD, AND PROGRAM

CROSS-REFERENCE TO RELATED APPLICATIONS

This application is a 371 U.S. National Phase of International Application No. PCT/JP2018/017409, filed on May 1, 2018, which claims priority to Japanese Application No. 2017-091742, filed May 2, 2017. The entire disclosures of the above applications are incorporated herein by reference.

TECHNICAL FIELD

The present invention relates to a signal generation device, a signal generation learning device, a method, and a program, and particularly, to a signal generation device, a signal generation learning device, a method, and a program for generating signals.

BACKGROUND ART

Conventionally, a method of generating images is known (Non-Patent Literatures 1 and 2). In a method disclosed in Non-Patent Literature 1, a generator that generates an image from random numbers is learned using generative adversarial networks (GAN) including a generator and a discriminator. In a method disclosed in Non-Patent Literature 2, a generator that generates an image from random numbers is learned using conditional generative adversarial networks (CGAN) including a generator and a discriminator using attribute information given as training data.

CITATION LIST

Non-Patent Literature

[Non-Patent Literature 1] I. Goodfellow et al., "Generative Adversarial Nets," NIPS2014
[Non-Patent Literature 2] M. Mirza and S. Osindero, "Conditional Generative Adversarial Nets," ArXiv: 1411. 1784v1, November 2014

SUMMARY OF INVENTION

Technical Problem

In the method disclosed in Non-Patent Literature 1, it is not possible to control an image to be generated.

In the method disclosed in Non-Patent Literature 2, since attributes representation performance are restricted by training data, there is a limitation on representation performance.

The present invention has been made in view of the above-described problems, and an object thereof is to provide a signal generation device, a method, and a program capable of generating various signals while controlling attributes.

Another object of the present invention is to provide a signal generation learning device and a program capable of learning neural networks capable of generating various signals while controlling signal attributes.

Solution to Problem

In order to attain the object, a signal generation device according to a first aspect of the present invention includes: a variable generation unit that generates a plurality of latent variables corresponding to a plurality of features of a signal; and a signal generation unit that inputs, to at least one neural network learned in advance, a latent variable representing attributes obtained by converting a part of the plurality of latent variables by an attribute vector representing attributes of a signal to be generated and the other part of the plurality of latent variables representing an identity and generates the signal to be generated using the at least one neural network.

According to a second aspect of the present invention, in the signal generation device according to the first aspect, the part of the plurality of latent variables includes latent variables for each of the attributes.

According to a third aspect of the present invention, in the signal generation device according to the first or second aspect, the signal generation unit has a plurality of layers that generates the signal to be generated, the signal generation unit has a neural network provided in each of the plurality of layers as the at least one neural network, a latent variable representing attributes of a first layer of the plurality of layers is the attribute vector, a latent variable representing attributes of each of second and subsequent layers of the plurality of layers is obtained by converting the part of the plurality of latent variables on the basis of a latent variable representing attributes of a layer shallower than a relevant layer, and the signal generation unit inputs the latent variable representing attributes of each of the plurality of layers to the respective neural network and generates the signal to be generated using the respective neural networks.

According to a fourth aspect of the present invention, in the signal generation device according to any one of the first to third aspects, the variable generation unit generates the plurality of latent variables using random numbers.

A signal generation method according to a fifth aspect of the present invention includes: generating, by a variable generation unit, a plurality of latent variables corresponding to a plurality of features of a signal; and inputting, by a learning unit, to at least one neural network learned in advance, a latent variable representing attributes obtained by converting a part of the plurality of latent variables by an attribute vector representing attributes of a signal to be generated and the other of the plurality of latent variables representing an identity to generate the signal to be generated using the at least one neural network.

A signal generation learning device according to a sixth aspect of the present invention includes: a variable generation unit that generates a plurality of latent variables representing features of a signal; and a learning unit that causes a first neural network as a generator and a second neural network as a discriminator to learn in accordance with competitive optimization conditions on the basis of the plurality of latent variables and learning data including a true signal, the first neural network generating a signal, and the second neural network discriminating whether the signal generated by the generator follows the same distribution as the true signal.

A signal generation learning method according to a seventh aspect of the present invention includes: generating, by a variable generation unit, a plurality of latent variables representing features of a signal; and causing, by a learning unit, a first neural network as a generator and a second neural network as a discriminator to learn in accordance with competitive optimization conditions on the basis of the plurality of latent variables and learning data including a true signal, the first neural network generating a signal, and the second neural network discriminating whether the signal generated by the generator follows the same distribution as the true signal.

A program according to an eighth aspect of the present invention is a program for causing a computer to function as any one of the signal generation devices according to the first to fourth aspects and the signal generation learning device according to the sixth aspect.

Advantageous Effects of Invention

According to the signal generation device, method, and program of the present invention, a latent variable representing the identity of a signal and a latent variable representing an attribute are generated. The latent variable representing the attribute is converted using the value of an attribute vector representing an attribute of a signal to be generated. Since a neural network generates a signal using the generated latent variable representing the identity and the conversion result as the input, an advantage that various signals can be generated while controlling an attribute is obtained.

According to the signal generation learning device, method, and program of the present invention, a latent variable representing the identity of a signal and a latent variable representing an attribute are generated. Since the first neural network as the generator for generating a signal and the second neural network as the discriminator that discriminates whether the generated signal follows the same distribution as a true signal are learned according to competitive optimization conditions on the basis of an input true signal, the generated latent variable representing the identity, and the generated latent variable representing the attribute, an advantage that the first neural network capable of generating various signals while controlling the attribute can be learned is obtained.

DESCRIPTION OF EMBODIMENTS

Hereinafter, embodiments of the present invention will be described with reference to the drawings.

Overview of First Embodiment of Present Invention

First, an overview of a first embodiment of the present invention will be described.

There are various types of image data in the world as a portrait image of a person. Examples thereof include various facial orientations, various lighting conditions, various ages, various looks, and the like.

A signal generation device of the present embodiment generates a plurality of latent variables and generates an image using neural networks. The plurality of latent variables is the essence useful for representing an image and indicates features of the image. The signal generation device uses convolutional neural networks (CNN), for example, as neural networks.

Moreover, one attribute indicating a feature of an image has diversities. For example, even in a case of "bangs", there are various shapes of bangs.

Figure 1:
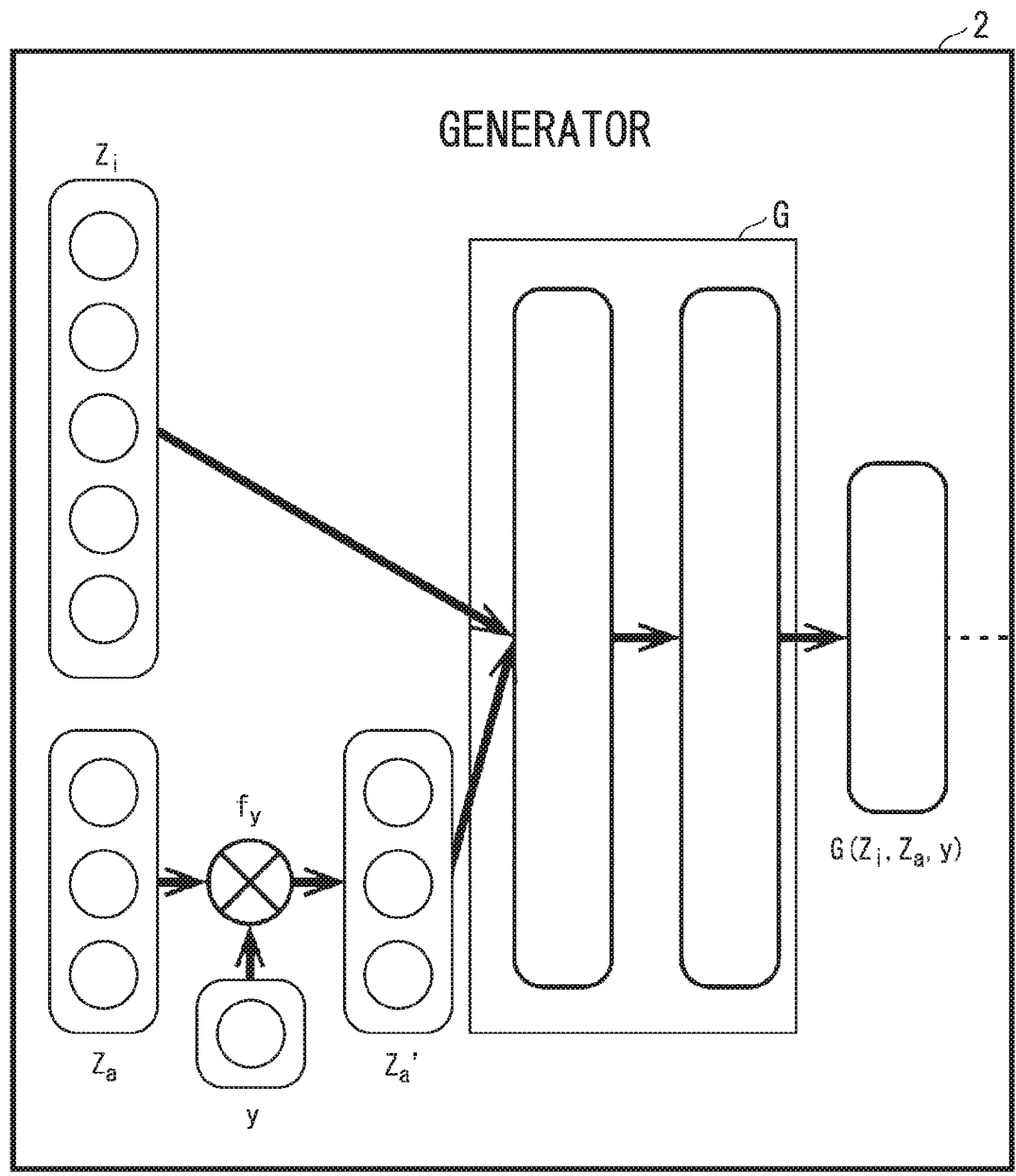
FIG. 1 is a conceptual diagram of a generator according to a first embodiment of the present invention.

In the present embodiment, as illustrated in FIG. 1, a generator 2 represents each attribute of an image to be generated using a plurality of latent variables. Specifically, a plurality of latent variables are separated into identities and attributes so that the attributes of an image generated by the generator 2 can be controlled easily. The generator 2 obtains sufficient representation performance by representing each attribute using a plurality of latent variables. When an attribute is represented by discrete values, a latent variable may be represented by a continuous value that can take any value in a segment determined by the discrete values that the attribute could take. The generator 2 obtains sufficient representation performance by representing each attribute using a latent variable having a continuous value. Similarly, when an attribute is represented by a certain distribution, a latent variable may be represented by a more detailed distribution. The generator 2 obtains sufficient representation performance by representing each attribute using a latent variable that follows a more detailed distribution.

The generator 2 illustrated in FIG. 1 has a neural network G including two layers of networks and generates image data $G(z_i, z_a, y)$ on the basis of an input attribute vector y and input latent variables $z_i$ and $z_a$. An attribute of an image is represented by a latent variable $z_a$ on which a restriction is imposed by the attribute vector y among the plurality of latent variables. The identity of an image is represented by a latent variable $z_i$ on which a restriction is not imposed by the attribute vector y among the plurality of latent variables. The attribute vector y represents the presence or the degree of at least one attribute.

When a structure of a generator is learned using GAN, since the random number z is the only input to the generator, it is impossible to easily separate identity and attributes. When CGAN is used, since the random number z and the attribute vector y are the input to the generator, the identity and the attributes can be separated by allowing the generator to perform learning together with a discriminator conditioned by the attribute vector y. However, since the attribute vector y represents a restrictive feature such as the presence or absence or positive or negative of an attribute, attribute information that can be separated from identities is restricted.

Figure 2:
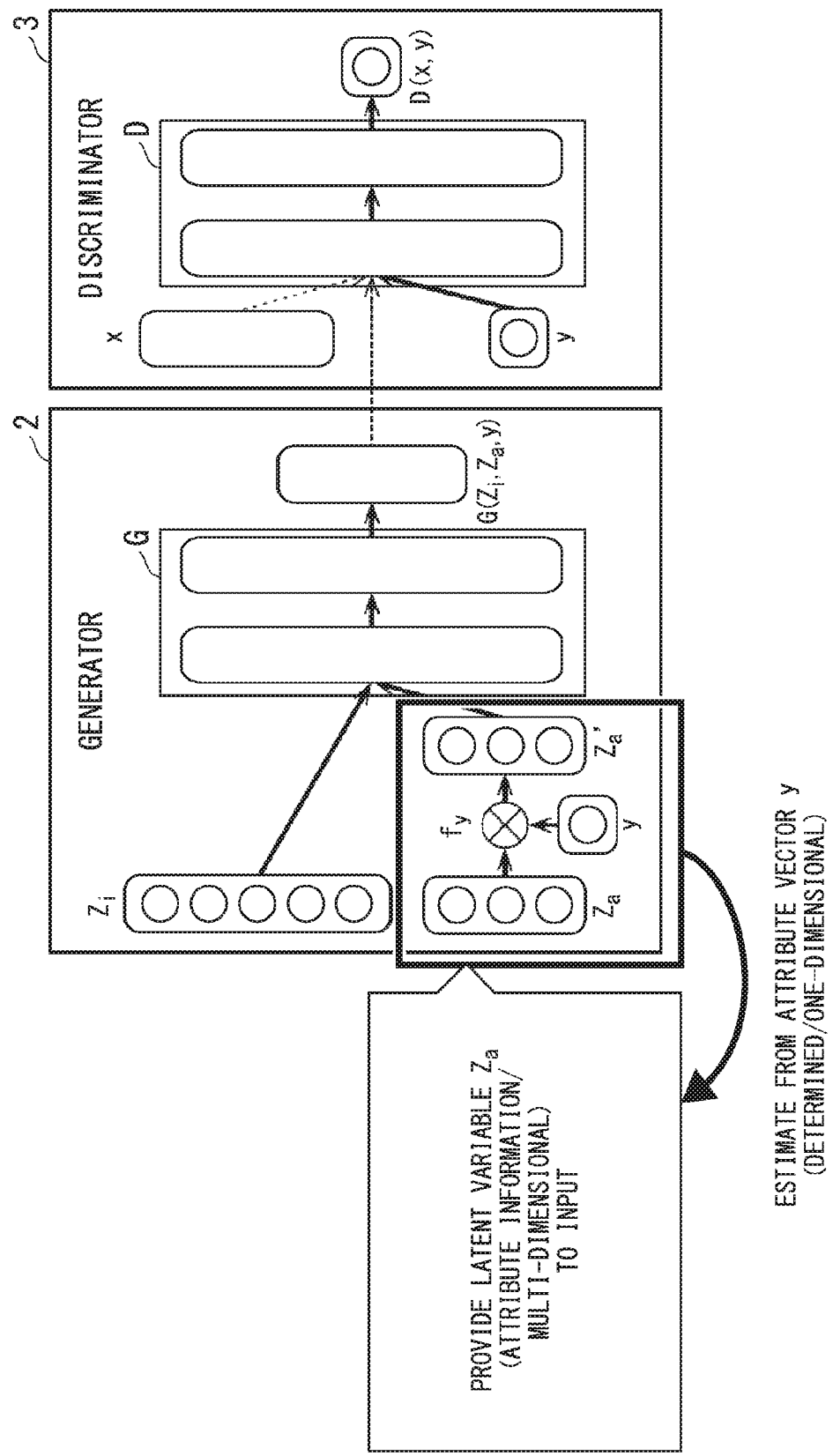
FIG. 2 is a conceptual diagram of the generator and a discriminator according to the first embodiment.

In the present embodiment, as illustrated in FIG. 2, conditional filtered generative adversarial networks (CF-GAN) are also learned during learning. CFGAN include a generator 2 and a discriminator 3. Since the input to the generator 2 includes a random number $z_i$ and $z_a'$ which is a multi-dimensional representation of attributes, the identity and the detailed attribute information $z_a$ can be separated by allowing the generator 2 to perform learning together with the discriminator 3 conditioned by the attribute information y.

Although the conventional method uses a GAN including a generator and a discriminator in order to refine an image (see Non-Patent Literature 1), the present embodiment uses a CFGAN including the generator 2 and the discriminator 3 in order to separate identity and attributes.

<Configuration of Signal Generation Device According to First Embodiment of Present Invention>

Figure 3:
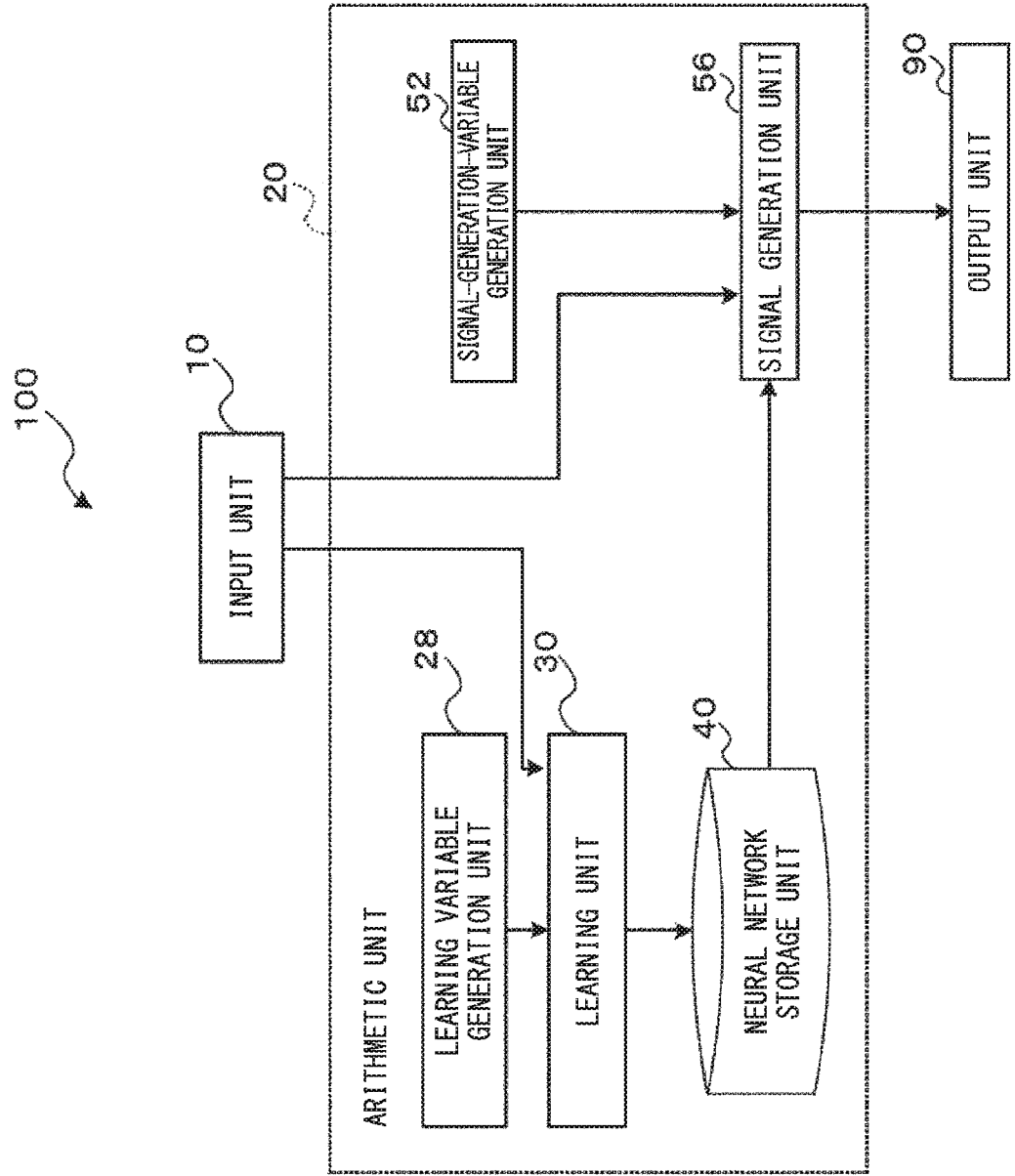
FIG. 3 is a block diagram illustrating a configuration of a signal generation device according to the first embodiment.

A configuration of a signal generation device according to a first embodiment of the present invention will be described. As illustrated in FIG. 3, a signal generation device 100 according to the first embodiment of the present invention includes an input unit 10, an arithmetic unit 20, and an output unit 90. The signal generation device 100 may be configured as a computer including a central processing unit (CPU), a random access memory (RAM), and a read only memory (ROM). The CPU may operate as the input unit 10, the arithmetic unit 20, and the output unit 90 by reading programs and various pieces of data for executing a learning process routine and a generation process routine to be described later stored in the ROM and executing the programs.

The input unit 10 receives a plurality of pieces of learning data including pairs of true image data x and the attribute vector y representing respective attributes of the image data x. The input unit 10 receives the attribute vector y representing respective attributes of image data to be generated. Although the attribute vector y represents the presence or absence or positive or negative of attributes, for example, there is no limitation thereto.

The arithmetic unit 20 includes a learning variable generation unit 28, a learning unit 30, a neural network storage unit 40, a signal-generation-variable generation unit 52, and a signal generation unit 56.

The learning variable generation unit 28 generates a latent variable $z_i$ representing the identity and a latent variable $z_a$ representing respective attributes from a certain data distribution. The learning variable generation unit 28 may generate the latent variable $z_i$ and the latent variable $z_a$ using random numbers.

For example, when the latent variable $z_a$ representing attributes is discrete, the learning variable generation unit 28 generates the latent variable $z_a$ representing attributes according to Expression (1).

[Expression. 1]

$$z_a \sim Cat\left(K = k, p = \frac{1}{k}\right) \quad (1)$$

In Expression (1), the term "k" represents the number of categories (the number of discrete values). Moreover, the term "Cat" represents a distribution made up of values indicating the respective categories of a category number K, and the term "p" represents a probability.

When the latent variable $z_a$ representing attributes is continuous, the learning variable generation unit 28 generates the latent variable $z_a$ representing attributes according to Expression (2).

[Expression. 2]

$$z_a \sim \text{Unif}(-1,1) \quad (2)$$

In Expression (2), the term "Unif(−1,1)" represents a uniform distribution in which values range from −1 to 1.

A generation method is not limited to these methods, and the latent variable $z_a$ may be generated from any distribution such as the Gaussian distribution or the Dirichlet distribution.

A latent variable generated from a certain distribution may be converted using another neural network to obtain and use the latent variable $z_a$.

The learning unit 30 has a neural network G (a first neural network) operating as the generator 2 and a neural network D (a second neural network) operating as a discriminator 3. The two neural networks G and D perform learning according to competitive optimization conditions on the basis of a plurality of pieces of learning data input to the input unit 10. The learning unit 30 receives true image data x, the attribute vector y representing respective attributes of the image data x, the generated latent variable $z_i$ representing an identity, and the generated latent variable $z_a$ representing respective attributes. The neural network G generates image data from the latent variable representing the identity and the latent variable representing the attributes. The neural network D receives the image data generated by the neural network G, the true image data x, and the attribute vector y and discriminates whether a generated image follows the same distribution as the true image data under the attribute vector y. That is, the neural network D discriminates whether the generated image data is distinguishable from the true image data. The true image data is included in the plurality of pieces of learning data. For example, a CNN may be used as the neural networks of the learning unit 30.

Specifically, the learning unit 30 receives the true image data x and the attribute vector y included in the input learning data, the generated latent variable $z_i$ representing an identity and the generated latent variable $z_a$ representing the attributes. Here, when the image data x is face image data, the attribute vector y represents the presence or absence of "glasses", "makeup", "beard", and "bangs" and discrimination of "male/female", "smiling or not-smiling face", and "old/young". The latent variable $z_a$ representing attributes represents the diversity of each attribute. When the attribute vector y represents the presence or absence of "glasses", the diversity of an attribute represents the shape and the color of glasses, for example.

When the image data x represents character image data, the attribute vector y represents the presence or absence of each of character types (example: a, b, c, . . . , 1, 2, . . . ). The latent variable $z_a$ representing attributes represents the diversity of characters. For example, when the attribute vector y represents a character "4", the diversity of the character represents the size and the shape of "4". Alternatively, the attribute vector y represents the presence or absence of each of character fonts (example: gothic, mincho, bold, italic, . . . ), and the latent variable $z_a$ representing attributes represents the diversity of a font. For example, when the attribute vector y represents a gothic font, the diversity of a font represents the type of a gothic font.

The learning unit 30 receives the latent variable $z_i$ representing the identity and the latent variable $z_a$ representing attributes generated by the learning variable generation unit 28 and generates image data from the latent variable $z_i$ representing the identity and the latent variable $z_a'$ representing attributes using the neural network G as the generator 2. The latent variable $z_a'$ representing attributes serving as the input to the neural network G as the generator 2 is obtained by converting the latent variable $z_a$ representing attributes using the value of the attribute vector y and represents respective attributes in multiple dimensions. As an example of conversion, when the attribute vector y represents the presence or absence of an attribute, the generated latent variable $z_a$ and the generated attribute vector y representing the attributes may be multiplied. Expression (3) indicates an example of conversion $f_y$ of this case.

[Expression. 3]

$$z_a' = \begin{cases} z_a & (y = 1) \\ 0 & (y = 0) \end{cases} \tag{3}$$

Alternatively, when the attribute vector y represents the positive or negative of an attribute, the positive or negative may be applied to the generated latent variable $z_a$ representing respective attributes according to the attribute vector y. Expression (4) indicates an example of conversion $f_y$ of this case.

[Expression. 4]

$$z_a' = \begin{cases} |z_a| & (y = 1) \\ -|z_a| & (y = 0) \end{cases} \tag{4}$$

In learning of the neural network G as the generator 2, the learning unit 30 updates parameters of the neural network G as the generator 2 so that the discriminator 3 discriminates that the generated image data follows the same distribution as the true image data x under the attribute vector y. That is, the parameters of the neural network G are updated so that the discriminator 3 discriminates that the generated image is included in true image data.

In learning of the neural network D(x, y) (hereinafter abbreviated as D) as the discriminator 3, the learning unit 30 updates the parameters of the neural network D as the discriminator 3 so that the discriminator 3 discriminates that the image data generated by the generator 2 does not follow the same distribution as the true image data x under the attribute vector y, and that the discriminator 3 discriminates that respective pieces of image data included in the true image data x follow the same distribution as the true image data x.

The optimization conditions under which the neural network G as the generator and the neural network D as the discriminator compete each other in learning are represented by Expression (5).

[Expression. 5]

$$\min_G \max_D \mathbb{E}_{x,y \sim P_{data}(x,y)}[\log D(x, y)] + \\ \mathbb{E}_{z_i \sim P_{z_i}(z_i), z_a \sim P_{z_a}(z_a), y \sim P_y(y)}[\log(1 - D(G(z_i, z_a, y), y))] \tag{5}$$

Operations included in Expression (5) and indicated by Expressions (6-1) to (6-4) mean as follows. The operation of Expression (6-1) represents sampling the true image data x and the attribute vector y from learning data. The operation of Expression (6-2) represents generating the latent variable $z_i$ representing an identity from a certain data distribution. For example, the latent variable $z_i$ representing an identity is generated using random numbers. The operation of Expression (6-3) represents generating the latent variable $z_a$ representing attributes from a certain data distribution. For example, the latent variable $z_a$ representing attributes is generated using random numbers. The operation of Expression (6-4) represents sampling the attribute vector y from learning data.

[Expression. 6]

$$x, y \sim P_{data}(x, y) \tag{6-1}$$

$$z_i \sim P_{z_i}(z_i) \tag{6-2}$$

$$z_a \sim P_{z_a}(z_a) \tag{6-3}$$

$$y \sim P_y(y) \tag{6-4}$$

The learning unit 30 performs the above-described process for each piece of learning data to repeatedly and alternately update the parameters of the neural network G as the generator 2 and the parameters of the neural network D as the discriminator 3.

The neural network G as the generator 2 and the neural network D as the discriminator 3 obtained finally are stored in the neural network storage unit 40.

The signal-generation-variable generation unit 52 generates the latent variable $z_i$ representing an identity and the latent variable $z_a$ representing attributes from a certain data distribution. The signal-generation-variable generation unit 52 may generate the latent variable $z_i$ and the latent variable $z_a$ using random numbers.

The signal generation unit 56 receives the latent variable $z_i$ representing an identity and the latent variable $z_a$ representing attributes generated by the signal-generation-variable generation unit 52 and the attribute vector representing the attributes of image data to be generated and reads the neural network G as the generator 2 stored in the neural network storage unit 40. The signal generation unit 56 generates image data from the attribute vector y and the latent variables $z_i$ and $z_a$ using the read neural network G and outputs the generated image data to the output unit 90. In this case, the latent variable $z_a'$ representing the attributes serving as the input to the neural network G as the generator 2 is obtained by converting the generated latent variable $z_a$ representing the attributes using the value of the attribute vector y. As an example of conversion, the generated latent variable $z_a$ and the generated attribute vector y representing the attributes may be multiplied. Since the latent variable $z_a$ representing the attributes has a plurality of latent variables for each attribute, the elements of the attribute vector y are multiplied by all of the plurality of latent variables corresponding to attributes.

<Operation of Signal Generation Device According to First Embodiment of Present Invention>

An operation of the signal generation device 100 according to the first embodiment of the present invention will be described. The signal generation device 100 executes a learning process routine and a generation process routine to be described later.

Figure 4:
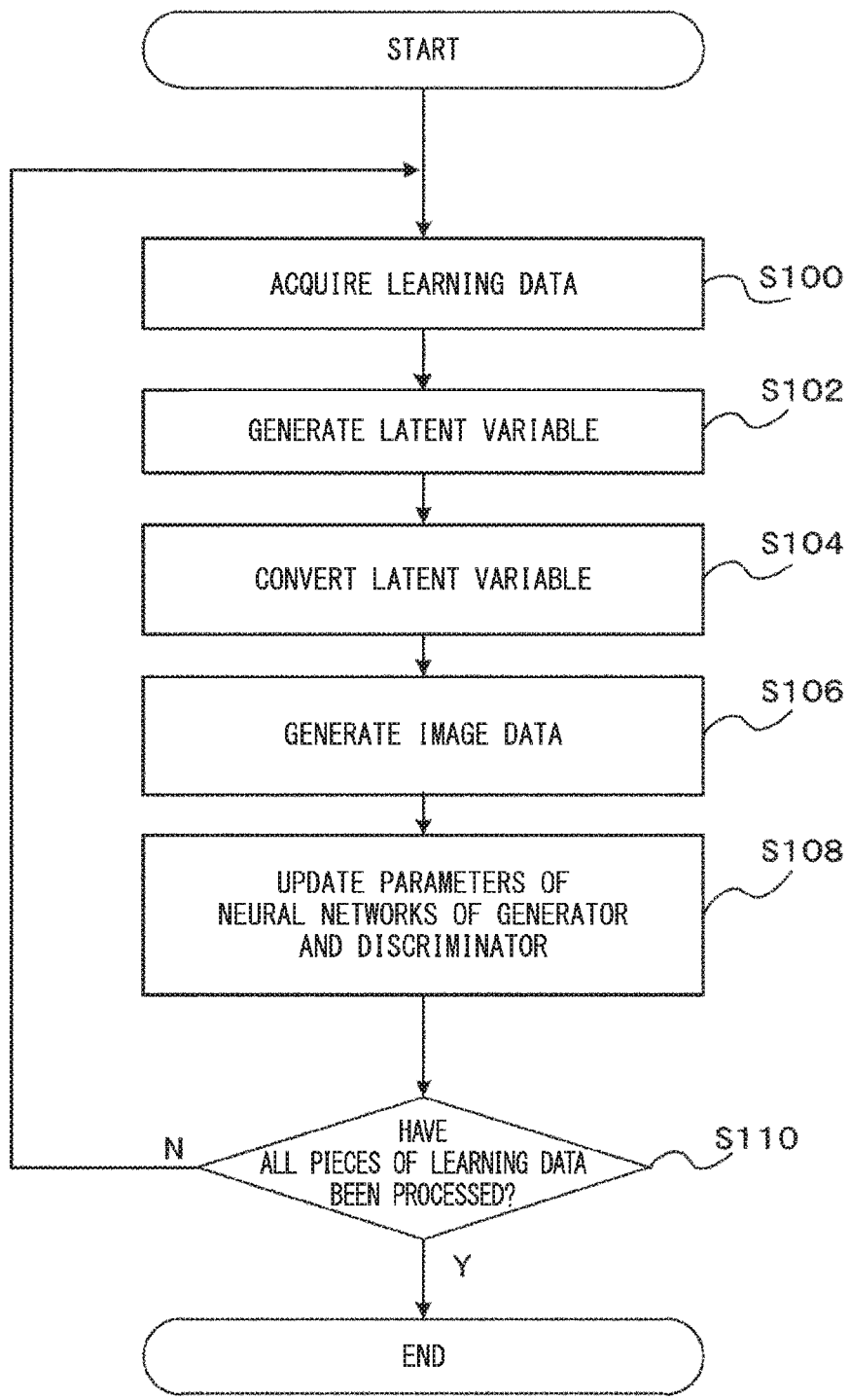
FIG. 4 is a flowchart illustrating a learning process routine of the signal generation device according to the first and second embodiments.

The learning process routine will be described. When the input unit 10 receives a plurality of pairs of the image data x and the attribute vector y as learning data, the signal generation device 100 executes the learning process routine illustrated in FIG. 4.

In step S100, the learning unit 30 acquires any one of the plurality of pieces of learning data received by the input unit 10.

In step S102, the learning variable generation unit 28 generates the latent variable $z_i$ representing the identity and the latent variable $z_a$ representing the attributes from a certain data distribution.

In step S104, the learning unit 30 obtains the latent variable $z_a'$ representing attributes by converting the latent variable $z_a$ representing the attributes generated in step S102 using the value of the attribute vector y included in the learning data acquired in step S100.

In step S106, the learning unit 30 generates image data xP using the neural network as the generator 2 from the latent variable $z_i$ representing the identity generated in step S102 and a conversion result $z_a'$ of the latent variable representing the attributes obtained in step S104.

In step S108, the learning unit 30 updates the parameters of the neural network G as the generator 2 and the parameters of the neural network D as the discriminator 3 on the basis of the latent variable $z_i$ representing the identity and the latent variable $z_a$ representing the attributes generated in step S102, the image data xP generated in step S106, and the image data x and the attribute vector y included in the learning data obtained in step S100.

In step S110, it is determined whether the learning unit 30 has executed the processes of steps S100 to S108 for all pieces of learning data. When there is learning data which has not been used in the processes of steps S100 to S108, the learning unit 30 returns to step S100 to acquire the learning data. When all pieces of learning data have been used in the processes of steps S100 to S108, the learning unit 30 ends the learning process routine. The learning unit 30 stores the parameters of the neural network G as the generator 2 and the parameters of the neural network D as the discriminator 3 obtained finally in the neural network storage unit 40.

Figure 5:
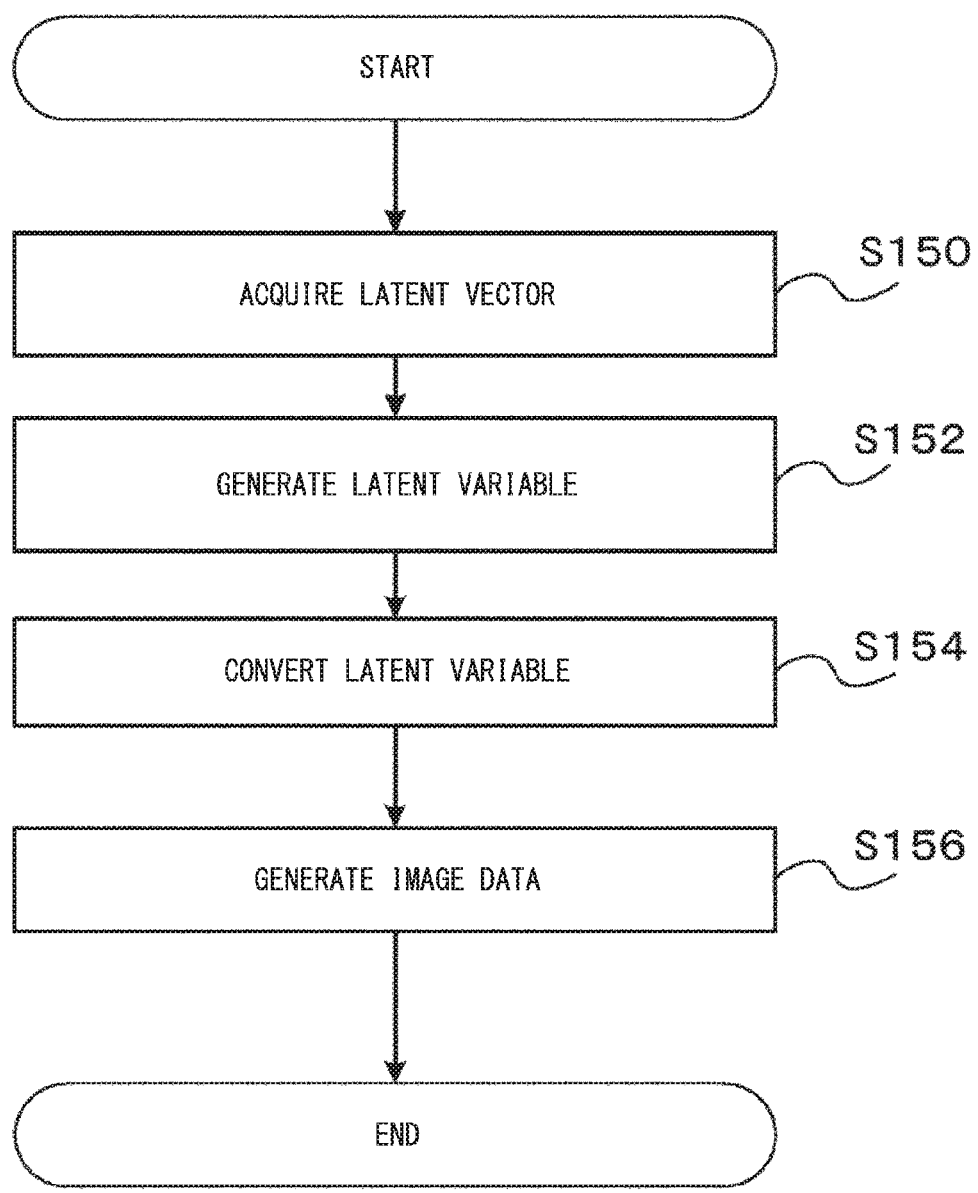
FIG. 5 is a flowchart illustrating a generation process routine of the signal generation device according to the first and second embodiments.

The generation process routine will be described. When the input unit 10 receives the attribute vector y representing the attributes of image data to be generated, the signal generation device 100 executes the generation process routine illustrated in FIG. 5.

In step S150, the signal generation unit 56 acquires the attribute vector y received by the input unit 10.

In step S152, the signal-generation-variable generation unit 52 generates the latent variable $z_i$ representing the identity and the latent variable $z_a$ representing the attributes from a certain data distribution. The latent variable $z_i$ representing the identity and the latent variable $z_a$ representing the attributes may be set arbitrarily by a user.

In step S154, the signal generation unit 56 converts the latent variable $z_a$ representing the attributes generated in step S152 using the value of the attribute vector y acquired in step S150 to obtain the latent variable $z_a'$ representing the attributes.

In step S156, the signal generation unit 56 generates image data using the neural network G as the generator 2 stored in a neural network storage unit 40 on the basis of the latent variable $z_i$ representing the identity generated in step S152 and the latent variable $z_a'$ representing the attributes obtained in step S154. The signal generation unit 56 outputs the generated image data through the output unit 90 and ends the generation process routine.

As described above, the signal generation device according to the first embodiment of the present invention generates the latent variable representing the identity of image data and the latent variable representing the attributes of the image data. The signal generation device receives the attribute vector representing the attributes of a signal to be generated and converts the latent variable representing the attributes using the value of the attribute vector. The signal generation device generates image data using the neural network as the generator and using the generated latent variable representing the identity and the conversion result as the input to the generator. By performing a signal generation method including the above-described operations, the signal generation device according to the first embodiment can generate various pieces of image data while controlling attributes of an image. For example, when only the attributes of glasses are to be changed, the latent variable $z_i$ representing the identity among the inputs to the signal generation unit may be fixed and the dimensions of the latent variables $z_a$ representing the attributes in multiple dimensions may be changed interactively. When only the identity is to be changed while maintaining attributes, the latent variable $z_a$ representing the attributes among the inputs to the signal generation unit may be fixed and the latent variable $z_i$ representing the identity may be changed.

The signal generation device according to the first embodiment of the present invention generates the latent variable representing the identity of image data and the latent variable representing the attributes of the image data. The signal generation device allows the neural network as the generator that generates an image and the neural network as the discriminator that discriminates whether generated image data follows the same distribution as the true image data under the attribute vector to perform learning according to competitive optimization conditions on the basis of the true image data included in input learning data, and the generated latent variable representing the identity and the generated latent variable representing the attributes. By performing a signal generation learning method including the above-described operations, the signal generation device can learn a neural network capable of generating various pieces of image data while controlling attributes of an image.

Since the signal generation learning device has a plurality of latent variables or latent variables that follow more detailed distributions for respective attributes, the signal generation learning device can represent the diversity of attributes.

In the above-described embodiment, although it has been described as an example that the learning unit 30 learns the neural network G as the generator 2 and the neural network D as the discriminator 3 according to competitive optimization conditions, there is no limitation thereto. For example, restrictions may be further provided so as to represent that respective latent variables are independent. Specifically, restrictions are further provided so that the correlation (an information amount) between the latent variable $z_a'$ and the image data generated from the latent variable $z_a'$ illustrated in Expression (7) increases.

[Expression 7]

$$\begin{aligned}
I(z_a'; G(z_i, z_a, y) \mid y) &= H(z_a' \mid y) - H(z_a' \mid G(z_i, z_a, y), y) \quad (7)\\
&= H(z_a' \mid y) + \\
&\quad \mathbb{E}_{x \sim G(z_i, z_a, y)}[\mathbb{E}_{z_a' \sim P(z_a' \mid x, y)}[\log P(\hat{z}_a' \mid x, y)]] \\
&= H(z_a' \mid y) + \\
&\quad \mathbb{E}_{x \sim G(z_i, z_a, y)}[D_{KL}(P(\cdot \mid x, y) \| Q(\cdot \mid x, y) + \\
&\quad \mathbb{E}_{z_a' \sim P(z_a' \mid x, y)}[\mathrm{Log}\, Q(\hat{z}_a' \mid x, y)]] \\
&\geq H(z_a' \mid y) + \\
&\quad \mathbb{E}_{x \sim G(z_i, z_a, y)}[\mathbb{E}_{z_a' \sim P(z_a' \mid x, y)}[\log Q(\hat{z}_a' \mid x, y)]] \\
&= H(z_a' \mid y) + \\
&\quad \mathbb{E}_{z_a' \sim P(z_a' \mid y), x \sim G(z_i, z_a')}[\log Q(z_a' \mid x, y)].
\end{aligned}$$

In Expression (7), the term "$I(z_a'; G(z_i, z_a, y) \mid y)$" represents a mutual information amount between an image $G(z_i, z_a, y)$ generated under the attribute vector y and the latent variable $z_a'$ representing the attributes. The term "$H(z_a' \mid y), H(z_a' \mid G(z_i, z_a, y), y)$" represents conditional entropy. The term "E" represents an expected value. The term "$D_{KL}$" represents Kullback-Leibler (KL) divergence. The term "$P(z_a' \mid x, y)$" represents the distribution of the latent variable $z_a'$ representing respective attributes when true image data x and the attribute vector y included in the learning data are applied. The term "$\hat{z}_a$" ($\hat{\ }$ is attached on top of $z_a$) is a latent variable obtained according to the distribution of $P(z_a' \mid x, y)$.

Since $P(z_a' \mid x, y)$ is unknown, it is difficult to directly obtain the information amount I. Therefore, approximation distribution $Q(z_a' \mid x, y)$ is introduced as described above. The learning unit 30 learns the neural network Q that estimates the approximation distribution $Q(z_a' \mid x, y)$ so that the lower limit of the information amount I is maximized using the calculus of variations and performs optimization of the competitive optimization conditions. In this way, when a plurality of latent variables for the attribute of "glasses" include a latent variable $z_a^1$ and a latent variable $z_a^2$, the latent variable $z_a^1$ for the attribute of "glasses" represents sunglasses, and the latent variable $z_a^2$ represents glasses other than sunglasses.

Overview According to Second Embodiment of Present Invention

A configuration of a signal generation device according to a second embodiment of the present invention will be described. Since the signal generation device according to the second embodiment is similar to the signal generation device according to the first embodiment, denotation will be with the same reference numerals and description thereof may be omitted.

The second embodiment is different from the first embodiment in that a latent variable representing attributes has a hierarchical structure.

Figure 6:
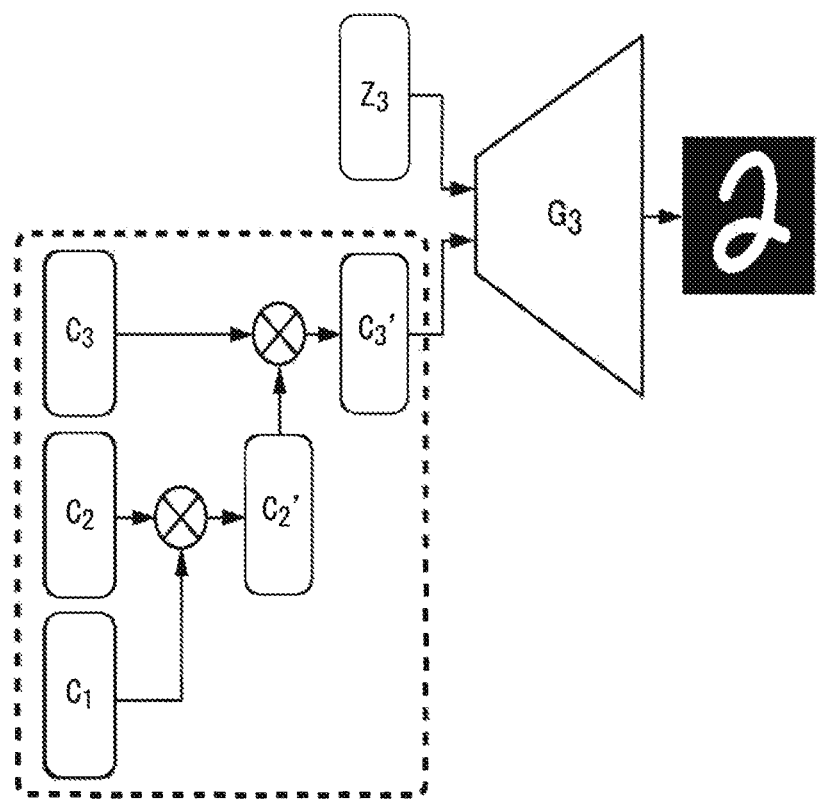
FIG. 6 is a conceptual diagram of a third-layer generator according to the second embodiment.

In the second embodiment, the signal generation device 100 performs hierarchical control on attributes. In order to realize this control, as illustrated in FIG. 6, a latent variable representing respective attributes is a hierarchical latent variable of two or more layers, and the learning unit 30 has a structure converting a latent variable hierarchically. A first-layer latent variable $c_1$ is a latent variable representing the attributes of the first layer and corresponds to the attribute vector y of the first embodiment. Although the latent variable represents the presence or absence or positive or negative of an attribute, for example, there is no particular limitation thereto.

A second-layer latent variable $c_2$ is converted by the value of the first-layer latent variable $c_1$ and a conversion result $c_2'$ is obtained. A third-layer latent variable $c_3$ is converted by the value of the conversion result $c_2'$ of the second-layer latent variable $c_2$ and a conversion result $c_3'$ is obtained. The signal generation device 100 uses a latent variable $z_3$ representing the identity and the conversion result $c_3'$ as the latent variable representing attributes as the input to the generator in the third layer and generates image data using a neural network $G_3$ as the generator. Similarly, the signal generation device 100 generates image data using the neural network $G_3$ as the generator in the first and second layers.

Figure 7:
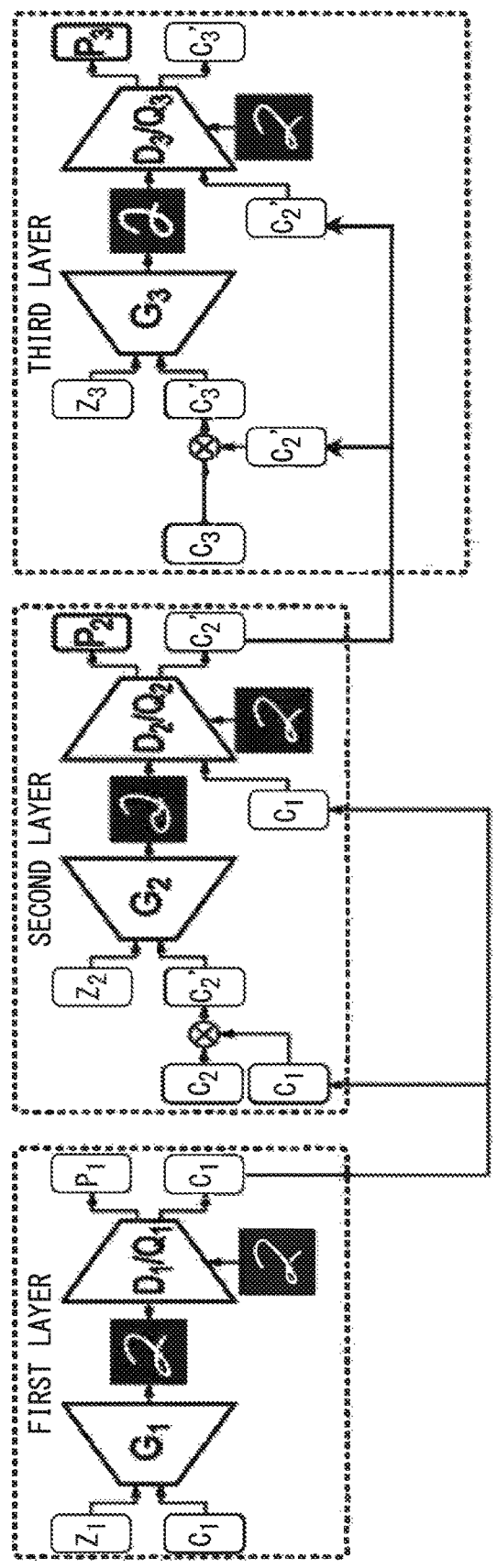
FIG. 7 is a conceptual diagram of a generator, a discriminator, and an approximation distribution according to the second embodiment.

In learning of the neural network, as illustrated in FIG. 7, a neural network $G_1$ that generates image data, a neural network $D_1$ as a discriminator, and a neural network $Q_1$ that estimates a distribution of the latent variable $c_1$ are learned using the first-layer latent variable $c_1$ and the latent variable $z_1$ representing the identity as the inputs. A neural network $G_2$ that generates image data, a neural network $D_2$ as a discriminator, and a neural network $Q_2$ that estimates a distribution of the latent variable $c_2'$ are learned using the conversion result $c_2'$ of the second-layer latent variable and the latent variable $z_2$ representing the identity as the inputs. A neural network $G_3$ that generates image data, a neural network $D_3$ as a discriminator, and a neural network $Q_3$ that estimates a distribution of the latent variable $c_3'$ are learned using a conversion result $c_3'$ of the third-layer latent variable and the latent variable $z_3$ representing the identity as the inputs. The learning in each layer is performed sequentially. $P_1$, $P_2$, and $P_3$ in FIG. 7 represent the discrimination results of the neural networks $D_1$, $D_2$, and $D_3$ as discriminators, respectively.

As described above, the signal generation device 100 first learns neural networks corresponding to the first-layer latent variable and recursively performs learning of respective neural networks corresponding to latent variables of one-step-deeper layer on the basis of the learning results to thereby learn the respective neural networks for each layer. By hierarchical learning, an abstractive concept is first acquired in a shallow layer, and the diversity of attributes can be gradually refined as the layer deepens.

<Configuration of Signal Generation Device According to Second Embodiment of Present Invention>

The input unit 10 of the signal generation device 100 according to the second embodiment of the present invention receives a plurality of pieces of true image data x as learning data.

The learning variable generation unit 28 generates a latent variable $z_i(z_1, z_2, z_3)$ representing the identity and latent variables $c_1$, $c_2$, and $c_3$ representing respective attributes of each layer from a certain data distribution. Although each latent variable may represent the presence or absence or positive or negative of an attribute in each layer, for example, there is no particular limitation thereto. The learning variable generation unit 28 may generate the latent variable $z_i(z_1, z_2, z_3)$ and the latent variables $c_1$, $c_2$, and $c_3$ using random numbers.

The learning unit 30 includes neural networks $G_1$, $G_2$, and $G_3$ operating as generators, neural networks $D_1$, $D_2$, and $D_3$ operating as discriminators, and neural networks $Q_1$, $Q_2$, and $Q_3$ that estimate a distribution of latent variables $c_1$, $c_2'$, and $c_3'$.

The neural networks $G_1$, $G_2$, and $G_3$ as the generators receive the true image data x, the generated latent variable $z_i$ representing the identity, and the latent variables $c_1$, $c_2$, and $c_3$ representing the attributes of each layer as the input and generate image data from the latent variable $z_i$ representing the identity and the latent variables $c_1$, $c_2$, and $c_3$ representing the attributes. The neural networks $D_1$, $D_2$, and $D_3$ operating as the discriminators discriminate whether the image data generated by the neural networks $G_1$, $G_2$, and $G_3$ follows the same distribution as the true image data. The neural networks $Q_1$, $Q_2$, and $Q_3$ estimate the approximation distributions of the distributions $P(c_1|x)$, $P(c_2'|x,c_1)$, and $P(c_3'|x,c_1,c_2')$ of the latent variables $c_1$, $c_2'$, and $c_3'$ representing the attributes of the image data generated by the neural networks $G_1$, $G_2$, and $G_3$. The neural networks $Q_1$, $Q_2$, and $Q_3$ estimate the latent variables $c_1$, $c_2'$, and $c_3'$ representing the attributes on the basis of the estimated approximation distributions.

The neural networks $G_1$, $G_2$, $G_3$, $D_1$, $D_2$, and $D_3$ operating as the generators and the discriminators learn in accordance with competitive optimization conditions on the basis of the plurality of pieces of learning data input to the input unit 10. At the same time, the neural networks $Q_1$, $Q_2$, and $Q_3$ perform learning so that the lower limit of the information amount of the image data generated by the neural networks $G_1$, $G_2$, and $G_3$ is maximized. The learning unit 30 performs learning recursively and repeatedly on the neural networks of the respective layers. For example, a CNN may be used as the respective neural networks of the learning unit 30.

Specifically, the learning unit 30 receives, for the first layer, the true image data x included in the input learning data, the generated latent variable $z_1$ representing the identity, and the generated latent variable $c_1$ representing attributes of the first layer as the input.

The learning unit 30 generates image data using the neural network $G_1$ as the generator using the generated latent variable $z_1$ representing the identity and the latent variable $c_1$ representing the attributes of the first layer as the input to the neural network $G_1$.

In learning of the neural network $G_1$ as the generator, the learning unit 30 updates parameters of the neural network $G_1$ so that the discriminator discriminates that the generated image data follows the same distribution as the true image data. That is, the parameters of the neural network $G_1$ are updated so that the neural network $D_1$ as the discriminator discriminates that the generated image is true image data.

In learning of the neural network $D_1$ as the discriminator, the learning unit 30 updates the parameters of the neural network $D_1$ as the discriminator so that the discriminator discriminates that the image data generated by the generator does not follow the same distribution as the true image data and that the discriminator discriminates that the respective pieces of image data included in the true image data x follow the same distribution as the true image data.

The neural network $Q_1$ predicts the latent variable $c_1$ representing the attributes of the first layer with respect to the image data generated by the neural network $G_1$ as the generator. In learning of the neural network $Q_1$, the learning unit 30 updates the parameters of the neural network $Q_1$ so that the lower limit of the correlation (an information amount) between the latent variable $c_1$ and the image data generated from the latent variable $c_1$ is maximized.

The learning unit 30 receives, for the second layer, the true image data x included in the input learning data, the latent variable $c_1$ representing the attributes of the first layer predicted by the neural network $Q_1$, the generated latent variable $z_2$ representing the identity, and the generated latent variable $c_2$ representing the attributes of the second layer as the input. In this case, the latent variable $c_2'$ representing the attributes of the second layer is obtained by converting the latent variable $c_2$ representing the attributes of the second layer using the value of the latent variable $c_1$ representing the attributes of the first layer. As an example of conversion, the latent variable $c_2$ representing the attributes of the second layer and the latent variable $c_1$ representing the attributes of the first layer may be multiplied.

The learning unit 30 generates image data using the neural network $G_2$ as the generator using the generated latent variable $z_2$ representing the identity and the conversion result $c_2'$ of the generated latent variable $c_2$ representing the attributes of the second layer as the input to the neural network $G_2$.

In the learning of the neural network $G_2$ as the generator, the learning unit 30 updates the parameters of the neural network $G_2$ as the generator so that the discriminator discriminates that the generated image data follows the same distribution as the true image data under the latent variable $c_1$ representing the attributes of the first layer. That is, the parameters of the neural network $G_2$ are updated so that the neural network $D_2$ as the discriminator discriminates that the generated image is true image data.

In learning of the neural network $D_2$ as the discriminator, the learning unit 30 updates the parameters of the neural network $D_2$ as the discriminator so that the discriminator discriminates that the image data generated by the generator does not follow the same distribution as the true image data under the latent variable $c_1$ representing the attributes of the first layer and that the discriminator discriminates that the respective pieces of image data included in the true image data x follow the same distribution as the true image data.

The neural network $Q_2$ predicts the latent variable $c_2'$ representing the attributes of the second layer with respect to the image data generated by the neural network $G_2$ under the latent variable $c_1$ representing the attributes of the first layer. In learning of the neural network $Q_2$, the learning unit 30 updates the parameters of the neural network $Q_2$ so that the lower limit of the correlation (an information amount) between the latent variable $c_2'$ and the image data generated from the latent variable $c_2'$ is maximized.

The learning unit 30 receives, for the third layer, the true image data x included in the input learning data, the latent variable $c_2'$ representing the attributes of the second layer predicted by the neural network $Q_2$, the generated latent variable $z_3$ representing the identity, and the generated latent variable $c_3$ representing the attributes of the third layer as the input. In this case, the latent variable $c_3'$ representing the attributes of the third layer is obtained by converting the latent variable $c_3$ representing the attributes of the third layer using the value of the conversion result $c_2'$ of the latent variable $c_2$ representing the attributes of the second layer.

The learning unit 30 generates image data using the neural network $G_3$ as the generator using the generated latent variable $z_3$ representing the identity and the conversion result $c_3'$ of the generated latent variable $c_3$ representing the attributes of the third layer as the input to the neural network $G_3$.

In learning of the neural network $G_3$ as the generator, the learning unit 30 updates the parameters of the neural network $G_3$ as the generator so that the discriminator discriminates that the generated image data follows the same distribution as the true image data under the conversion result $c_2'$ of the latent variable $c_2$ representing the attributes of the second layer. That is, the parameters of the neural network $G_3$ are updated so that the neural network $D_3$ as the discriminator discriminates that the generated image is true image data.

In learning of the neural network $D_3$ as the discriminator, the learning unit 30 updates the parameters of the neural network $D_3$ as the discriminator so that the discriminator discriminates that the image data generated by the generator does not follow the same distribution as the true image data under the conversion result $c_2'$ of the latent variable $c_2$ representing the attributes of the second layer and the discriminator discriminates that the respective pieces of image data included in the true image data x follow the same distribution as the true image data.

The neural network $Q_3$ predicts the latent variable $c_3'$ representing the attributes of the third layer with respect to the image data generated by the neural network $G_3$ under the conversion result $c_2'$ of the latent variable $c_2$ representing the attributes of the second layer. In learning of the neural network $Q_3$, the learning unit 30 updates the parameters of the neural network $Q_3$ so that the lower limit of the correlation (an information amount) between the latent variable $c_3'$ and the image data generated from the latent variable $c_3'$ is maximized.

The learning unit 30 performs the above-described process for respective pieces of learning data to repeatedly update the parameters of various neural networks.

The neural networks $G_1$, $G_2$, and $G_3$ as the generators, the neural networks $D_1$, $D_2$, and $D_3$ as the discriminators, and the neural networks $Q_1$, $Q_2$, and $Q_3$ obtained finally are stored in the neural network storage unit 40.

The signal-generation-variable generation unit 52 generates the latent variable $z_i(z_1,z_2,z_3)$ representing the identity and the latent variables $c_2$ and $c_3$ representing the attributes of each layer subsequent to the second layer from a certain data distribution. The signal-generation-variable generation unit 52 may generate the latent variable $z_i(z_1,z_2,z_3)$ and the latent variables $c_2$ and $c_3$ using random numbers.

The signal generation unit 56 receives, for each layer, the latent variable $z_i$ representing the identity generated by the signal-generation-variable generation unit 52, the latent variable representing the attributes of the layer or the conversion result of the latent variable representing the attributes of the layer as the input. The signal generation unit 56 generates image data using the neural network as the generator stored in the neural network storage unit 40 and outputs the generated image data through the output unit 90.

Figure 8:
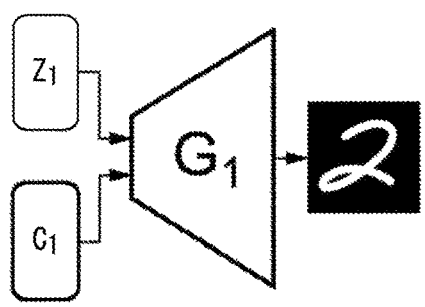
FIG. 8 is a conceptual diagram of a first-layer generator according to the second embodiment.

Specifically, the signal generation unit 56 uses the neural network $G_1$ as the generator stored in the neural network storage unit 40. As illustrated in FIG. 8, the signal generation unit 56 receives, for the first layer, the latent variable $z_1$ representing the identity generated by the signal-generation-variable generation unit 52 and the latent variable $c_1$ representing the attributes of the first layer and generates image data using the neural network $G_1$. The signal generation unit 56 outputs the generated image data through the output unit 90.

Figure 9:
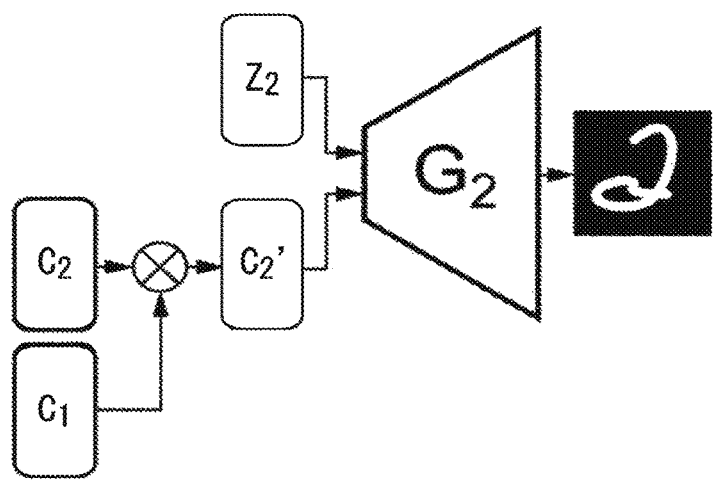
FIG. 9 is a conceptual diagram of a second-layer generator according to the second embodiment.

The signal generation unit 56 uses the neural network $G_2$ as the generator stored in the neural network storage unit 40. As illustrated in FIG. 9, the signal generation unit 56 receives, for the second layer, the latent variable $z_2$ representing the identity generated by the signal-generation-variable generation unit 52 and the conversion result $c_2'$ of the latent variable $c_2$ representing the attributes of the second layer and generates image data using the neural network $G_2$. The signal generation unit 56 outputs the generated image data through the output unit 90. The latent variable $c_2'$ representing the attributes of the second layer is obtained by converting the generated latent variable $c_2$ representing the attributes of the second layer using the value of the latent variable $c_1$ representing the attributes of the first layer. Since the latent variable $c_2$ representing the attributes of the second layer has a plurality of latent variables for each attribute, the first-layer latent variable $c_1$ is multiplied by all the plurality of latent variables corresponding to the attributes represented by the latent variable $c_1$.

The signal generation unit 56 uses the neural network $G_3$ as the generator stored in the neural network storage unit 40. As illustrated in FIG. 6, the signal generation unit 56 receives, for the third layer, the latent variable $z_3$ representing the identity generated by the signal-generation-variable generation unit 52 and the conversion result $c_3'$ of the latent variable $c_3$ representing the attributes of the third layer and generates image data using the neural network $G_3$. The signal generation unit 56 outputs the generated image data through the output unit 90. The latent variable $c_3'$ representing the attributes of the third layer is obtained by converting the generated latent variable $c_3$ representing the attributes of the third layer using the value of the conversion result $c_2'$ of the latent variable $c_2$ representing the attributes of the second layer.

When the fourth and subsequent layers are present, the learning unit 30 converts the latent variable $c_2$ representing the attributes of the second layer using the value of the latent variable $c_1$ representing the attributes of the first layer. The learning unit 30 repeats converting a plurality of latent variables of the next layer using the value of the conversion result of the plurality of latent variables of each of the second and subsequent layers sequentially. The learning unit 30 may input the generated latent variable $z_i$ representing the identity and the conversion result obtained for the layer to the neural network as the generator to generate image data.

Since the other configuration and operation of the signal generation device according to the second embodiment are the same as those of the first embodiment, the description thereof will be omitted.

As described above, the signal generation device according to the second embodiment of the present invention generates a latent variable representing the identity of image data and latent variables representing the attributes of the second and subsequent layers. The signal generation device converts the latent variable representing the attributes of the second layer using the value of the latent variable representing the attributes of the first layer, representing the presence or absence or positive or negative of each attributes of a signal to be generated. The signal generation device converts the latent variables representing the attributes of the third and subsequent layers in a similar manner. The signal generation device inputs, for each layer, the generated latent variable representing the identity and the latent variable representing the attributes of the layer or the conversion result of the latent variable representing the attributes of the layer to the neural network as the generator to generate image data. By performing a signal generation method including the above-described operations, the signal generation device according to the second embodiment can generate various pieces of image data while controlling attributes of an image.

The signal generation device according to the second embodiment of the present invention generates a latent variable representing the identity of image data and latent variables representing the attributes of the second and subsequent layers. The signal generation device recursively and repeatedly learns the neural network as the generator that generates an image and the neural network as the discriminator that discriminates whether the generated image data follows the same distribution as the true image data under the latent variable (or the conversion result) representing the attributes of one-step shallower layer with respect to each layer according to competitive optimization conditions on the basis of the true image data included in the input learning data, the predicted latent variable representing the attributes of the first layer of the image data to be generated, the generated latent variable representing the identity, and the latent variable representing the attributes of the second and subsequent layers. By performing a signal learning method including the above-described operations, the signal generation device can learn a neural network capable of generating various pieces of image data while controlling the attributes of an image.

Figure 10A:
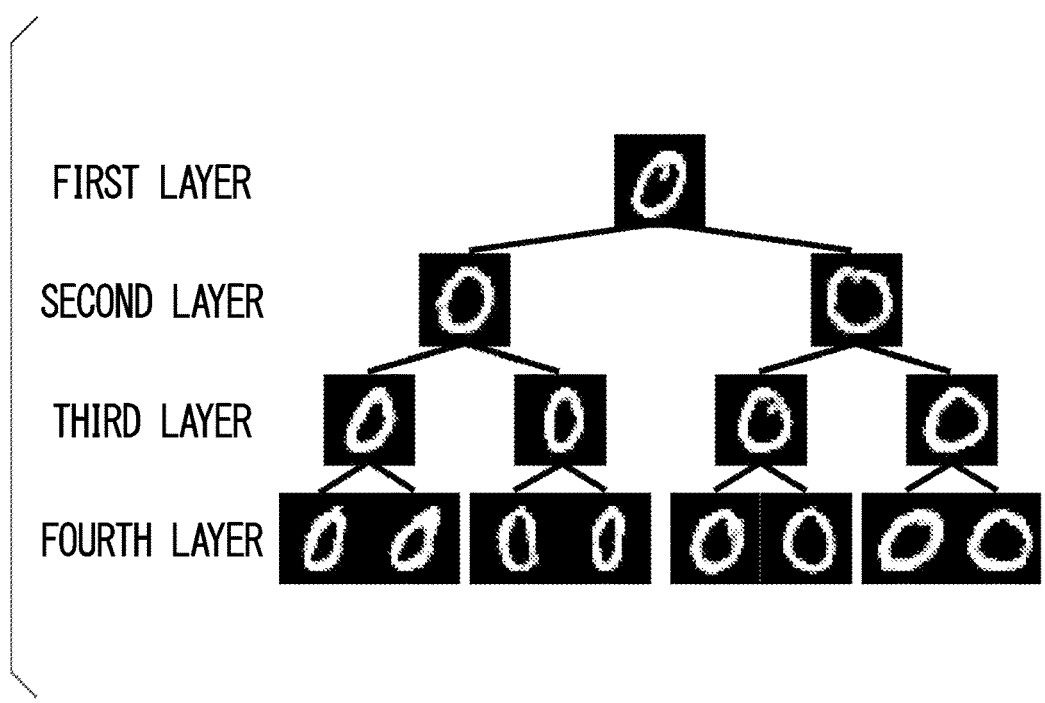
FIG. 10A is a diagram illustrating an example in which image data representing a handwritten number is generated by the signal generation device according to the second embodiment.
Figure 10B:
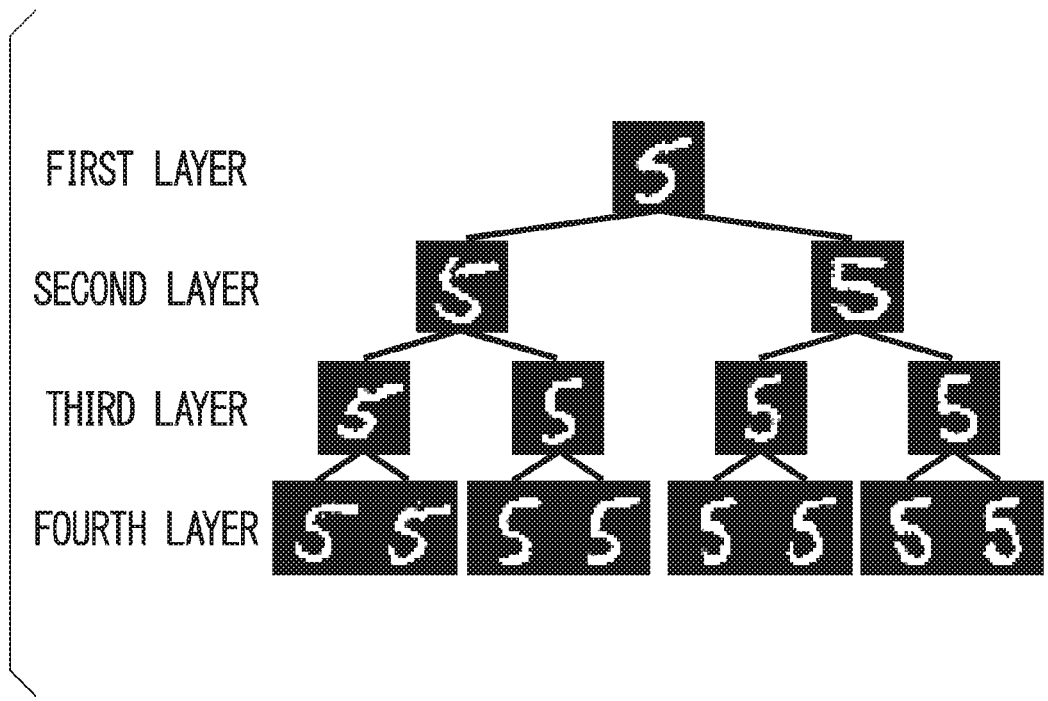
FIG. 10B is a diagram illustrating another example in which image data representing a handwritten number is generated by the signal generation device according to the second embodiment.

For example, as illustrated in FIGS. 10A and 10B, the signal generation device according to the second embodiment can generate various pieces of image data representing handwritten numbers. In the second embodiment, although it has been described as an example that the latent variable $c_1$ representing the attributes of the first layer is predicted from the image data included in the learning data and is used for learning, there is no limitation thereto. For example, when learning is performed, the latent variable c representing the attributes of the first layer may be input as the learning data. FIGS. 10A and 10B illustrate examples of image data generated when the latent variable $c_1$ is input as learning data. Specifically, information on a character type (1, 2, 3, . . . ) is given as learning data. FIG. 10A illustrates image data generated by neural networks as generators of the first to fourth layers when a latent variable representing the attributes of the first layer having the attribute of "0" is input. Moreover, FIG. 10B illustrates image data generated by neural networks as generators of the first to fourth layers when a latent variable representing the attributes of the first layer having the attribute of "5" is input. In the examples illustrated in FIGS. 10A and 10B, the latent variables representing the identity are different in respective layers.

Figure 11A:
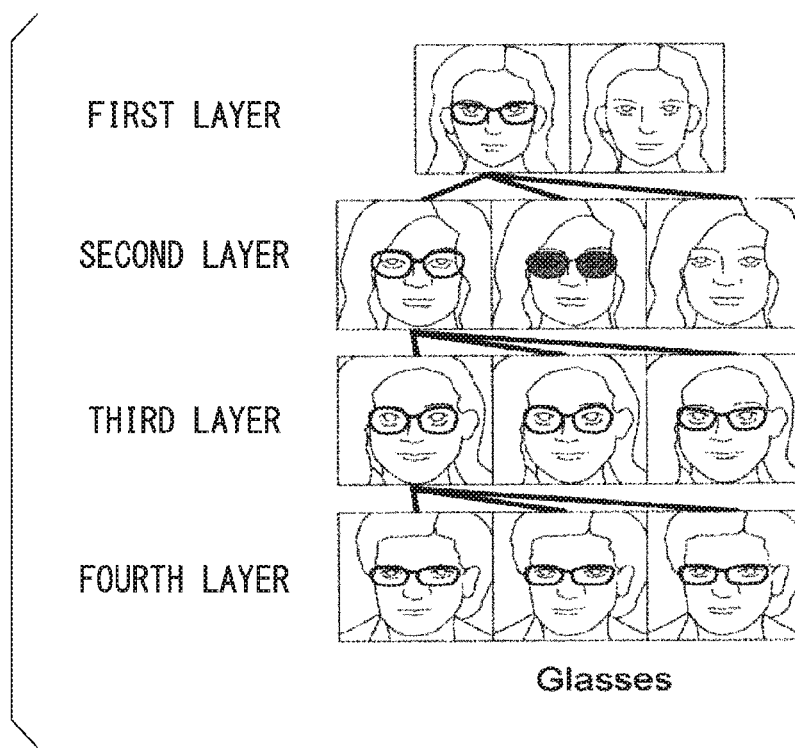
FIG. 11A is a diagram illustrating a first example in which image data representing a face image is generated by the signal generation device according to the second embodiment.
Figure 11B:
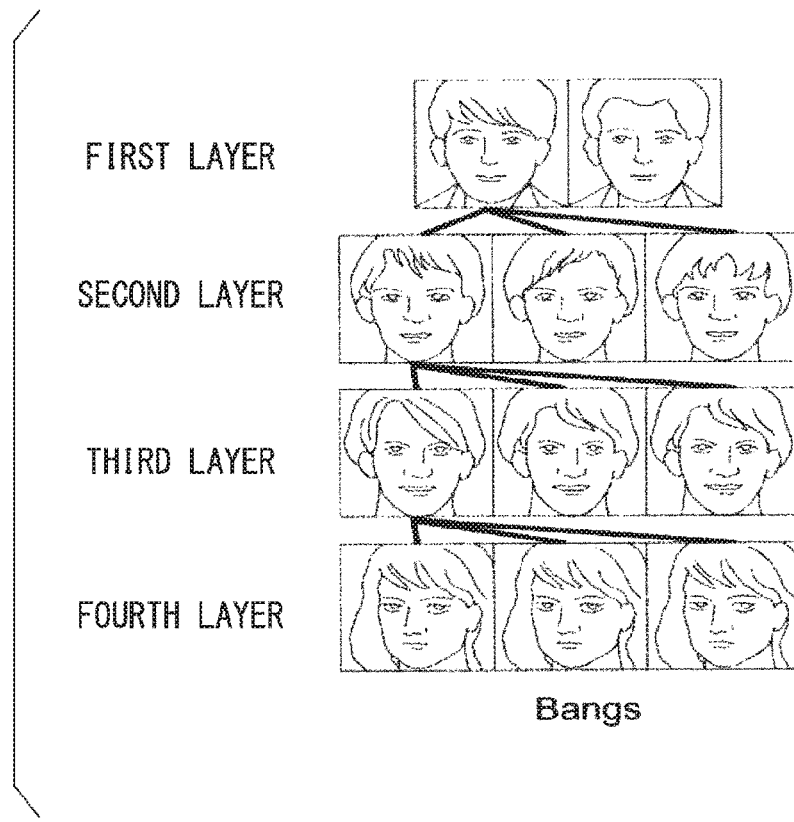
FIG. 11B is a diagram illustrating a second example in which image data representing a face image is generated by the signal generation device according to the second embodiment.
Figure 11C:
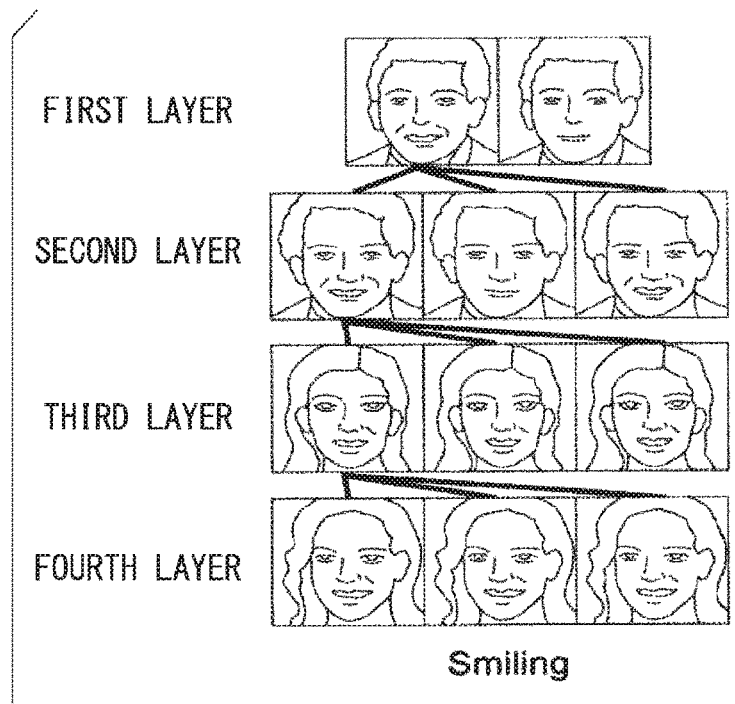
FIG. 11C is a diagram illustrating a third example in which image data representing a face image is generated by the signal generation device according to the second embodiment.

As illustrated in FIGS. 11A, 11B, and 11C, the signal generation device according to the second embodiment can generate various pieces of image data representing face images. In the examples illustrated in FIGS. 11A, 11B, and 11C, the latent variable $c_1$ is input as learning data. Specifically, information on the presence or absence of an attribute is given as learning data. FIG. 11A illustrates image data generated by neural networks as generators of the first to fourth layers when a latent variable representing the attributes of the first layer having the attribute of "glasses" is input. FIG. 11B illustrates image data generated by neural networks as generators of the first to fourth layers when a latent variable representing the attributes of the first layer having the attribute of "bangs" is input. FIG. 11C illustrates image data generated by neural networks as generators of the first to fourth layers when a latent variable representing the attributes of the first layer having the attribute of "smiling face" is input. In the examples illustrated in FIGS. 11A, 11B, and 11C, the latent variables representing the identity are different in respective layers.

As in the examples illustrated in FIGS. 10A, 10B, 11A, 11B, and 11C, by changing the values of the latent variables $c_1$, $c_2$, $c_3$, etc. representing the attributes of the first layer, second layer, third layer, etc., the signal generation device can control the attributes of an image multi-dimensionally and hierarchically to generate an image.

The present invention is not limited to the above-described embodiments and various modifications and applications can occur without departing from the spirit of the invention.

For example, in the above-described embodiments, although the signal generation device 100 includes the learning unit 30 that performs learning of a neural network, there is no limitation thereto. For example, a signal generation learning device including the learning variable generation unit 28 and the learning unit 30 may be separated from the signal generation device 100 including the signal-generation-variable generation unit 52 and the signal generation unit 56.

In the above-described embodiments, a case in which an input signal is face image data or character image data has been described as an example. However, the input signal is not limited thereto but the other image data may be input. For example, the input signal may be animal image data (for example, bird image data). In this case, the attribute vector y represents the presence or absence of a color and the latent variable $z_a$ representing an attribute represents the diversity of a color. For example, the attribute vector y represents the presence or absence of red and the latent variable $z_a$ represents a red part of a bird or the shade of red. Alternatively, the attribute vector y represents the shape of each part of a bird and the latent variable $z_a$ representing an attribute represents the diversity of each part of a bird. For example, the attribute vector y represents whether a distal end of a beak is round or sharp and the latent variable $z_a$ represents the roundness of the beak.

The input signal may be background image data. In this case, the attribute vector y represents a background type and the latent variable $z_a$ representing an attribute represents the diversity of a background type. For example, the attribute vector y represents the presence or absence of a sea, a mountain, a river, a house, or a road and the latent variable $z_a$ represents which sea, mountain, river, house, or road is included.

The input signal may be house image data. In this case, the attribute vector y represents the presence or absence of a color and the latent variable $z_a$ representing an attribute represents the diversity of a color. For example, the attribute vector y represents the presence or absence of red and the latent variable $z_a$ represents a red part of a house or the shade of red.

The input signal may be structure image data. In this case, the attribute vector y represents the presence or absence of each structure type and the latent variable $z_a$ representing an attribute represents the diversity of a structure. For example, the attribute vector y represents the presence or absence of a building, a detached house, and a tower, and the latent variable $z_a$ represents the shape of a structure.

Alternatively, the attribute vector y represents the presence or absence of the shape of parts of a structure and the latent variable $z_a$ representing an attribute represents the diversity of parts. For example, the attribute vector y represents the presence or absence of a flat roof, a round roof, and a triangular roof and the latent variable $z_a$ represents the flatness of the roof.

In the above-described embodiments, a case in which the input signal is image data has been described as an example. However, the input signal is not limited to this and may be a signal other than the image data. For example, the input signal may be audio signal (or a music signal), text data, or video data.

When the input signal is audio signal, the signal generation device may generate a latent variable representing the identity and a latent variable representing attributes, and the neural network as the generator may generate the audio signal. The latent variable representing the attributes may represent an attribute related to a person who is a generation source of the audio signal or an attribute related to an element that forms the audio signal. For example, an attribute related to a person who is a generation source of an audio signal represents the presence or absence of charm, emotion, dialect, and the like, the gender of the person, and the age of the person. An attribute related to an element that forms the audio signal represents the speed, the voice pitch, and the like of a speech. In this way, the signal generation device can generate various audio signals while controlling the attributes of a sound.

When the input signal is text data, the signal generation device may generate a latent variable representing the identity and a latent variable representing attributes, and the neural network as a generator may generate text data. The latent variable representing the attributes may represent an attribute related to a person which is a generation source of the text data and an attribute related to an element that forms the text data. For example, the attribute related to a person represents politeness, the gender of the person, and the like. The attribute related to the element represents whether the text is abstractive or concrete, whether the text is emotional, the genre of the text, whether the text is colloquial or literary, and whether the text is formal. In this way, the signal generation device can generate various pieces of text data while controlling the attributes of text.

When the input signal is video data, the signal generation device may generate a latent variable representing the identity and a latent variable representing attributes, and the neural network as the generator may generate video data. The latent variable representing the attributes represents an attribute related to an element that forms the video data. For example, the attribute related to an element represents a comical degree, whether the video is old or new, whether the video is live filming or animation, the presence or absence of emotion, the genre of the video, and the like. In this way, the signal generation device can generate various pieces of video data while controlling the attributes of the video.

When the input signal is a music signal (song), the signal generation device may generate a latent variable representing the identity and a latent variable representing attributes, and the neural network as the generator may generate a music signal. For example, the latent variable representing the identity represents a tone and the latent variable representing the attributes represents a melody. The melody includes a rap melody, an orchestra melody, and the like. In this way, the signal generation device can generate various music signals while controlling the attribute of the music signal.

In the above-described embodiment, although it has been described as an example that a CNN is used as the generator, the discriminator, and the neural network that estimates an approximation distribution, there is no limitation thereto and other neural network structures may be used. For example, a fully connected network or a recurrent neural network (RNN), which is a model that takes time-series properties into consideration, may be used. An RNN may be formed using a long short-term memory (LSTM).

In the second embodiment, although it has been described as an example that the latent variable c representing the attributes of the first layer is predicted from the image data included in the learning data and is used for learning, there is no limitation thereto. When learning is performed, the latent variable $c_1$ representing the attributes of the first layer may be input to the learning unit 30 as the learning data.

The latent variable representing the attributes of any layer as well as the latent variable $c_1$ representing the attributes of the first layer may be input to the learning unit 30 as the learning data so that the deeper layers are learned.

In the first embodiment, although it has been described as an example that the attribute vector y is provided to all pieces of image data x included in the learning data, there is no limitation thereto. The attribute vector y may be provided to a portion of the image data x included in the learning data. Alternatively, the learning data may not include the attribute vector y. In this case, the signal generation device may estimate the attribute vector y similarly to the signal generation device of the second embodiment estimating the latent variable $c_1$ representing the attributes corresponding to the attribute vector y. The signal generation device may learn the respective neural networks on the basis of the estimated attribute vector y.

In the second embodiment, when the latent variable representing the attributes of any layer is input as the learning data, a latent variable may be provided to a portion of the image data x included in the learning data.

A case in which the signal generation device of the second embodiment converts the latent variable $c_i$ using the value of the latent variable $c_{i-1}'$ representing the attributes of a previous layer to obtain the latent variable $c_i'$ has been described. However, the present invention is not limited thereto, and the signal generation device may convert the latent variable $c_i$ using at least one of the latent variables $c_j'$ (j=1, 2, . . . , i−1) of layers shallower than the layer corresponding to the latent variable $c_i'$ to obtain the latent variable $c_i'$. For example, when the latent variable $c_i'$ is to be obtained, the signal generation device may convert the latent variable $c_i$ using the latent variable $c_{i-2}'$ of a layer, two layers shallower than the layer corresponding to the latent variable $c_i'$ to obtain the latent variable $c_i'$. Furthermore, the signal generation device may obtain the latent variable $c_i'$ on the basis of a predetermined relation between the latent variable $c_i'$ and the latent variable $c_j'$ (j=1, 2, . . . , i−1) of layers shallower than the layer corresponding to the latent variable $c_i'$.

In the generator 2 of the signal generation device of the first embodiment, a neural network may perform a process of converting the latent variable $z_a$ using the attribute vector y. The learning unit may perform learning of the neural network that converts the latent variable $z_a$ as well as learning of the neural network G as the generator. In the generator 2 of the signal generation device of the second embodiment, a neural network may perform a process of converting the latent variable $c_i$ using the latent variable $c_{i-1}'$ to obtain the latent variable $c_i'$. The learning unit may perform learning of the neural network that obtains the latent variable $c_i'$ as well as learning of the neural network $G_i$ as the generator.

A case in which the signal generation device of the first embodiment generates the latent variables $z_i$ and $z_a$ using random numbers based on a category distribution or a uniform distribution has been described. However, a method of generating the latent variables $z_i$ and $z_a$ is not limited thereto. For example, the signal generation device may generate the latent variables $z_i$ and $z_a$ on the basis of any distribution including the Gaussian distribution or the Dirichlet distribution. Similarly, the signal generation device of the second embodiment may generate the latent variables $z_1$, $z_2$, $z_3$, $c_1$, $c_2$, and $c_3$ on the basis of any distribution including the Gaussian distribution or the Dirichlet distribution. Alternatively, the signal generation device of the first and second embodiments may include neural networks that generate respective latent variables.

A case in which the signal generation device of the first and second embodiments uses an objective function represented by Expression (5) as the optimization condition of the learning of the neural network G as the generator and the neural network D as the discriminator has been described. However, the objective function representing the optimization condition of the learning of the neural network G as the generator and the neural network D as the discriminator is not limited thereto. For example, the signal generation device may use any extension model including the least squares GAN or the Wasserstein GAN.

A case in which the neural network D as the discriminator of the first and second embodiments discriminates whether the image data generated by the generator follows the same distribution as the true image data under the attribute vector has been described. However, a target discriminated by the neural network D as the discriminator is not limited thereto. For example, the neural network D as the discriminator may discriminate whether the generated image data follows the same distribution as the true image data. In this case, a discrimination result of whether image data includes an attribute vector may be added to an objective function of the learning of the neural network G as the generator and the neural network D as the discriminator. The fact that the image data includes an attribute vector means that an attribute (feature) indicated by the attribute vector is included in the image data. Discrimination of whether image data includes an attribute vector may be performed by a neural network $Q_l$ (l=1, 2, ..., L) that estimates an approximation distribution of $P(c_1|x)$ and $P(c|x,p)$, for example.

When a discrimination result of whether image data includes an attribute vector is added to an objective function as the optimization condition, the objective function is represented by Expression (8), for example. In learning which uses the objective function represented by Expression (8), learning of the neural network G as the generator, the neural network D as the discriminator, and the neural network $Q_l$ (l=1, 2, ..., L) that estimates an approximation distribution of $P(c_1|x)$ and $P(c|x,p)$ is performed.

[Expression. 8]

$$\min_G \max_D \min_{Q_1,\cdots,Q_L} \mathcal{L}_{GAN}(D, G) - \qquad (8)$$

$$\lambda_1 \mathcal{L}_{MI/AC}(G, Q_1) - \sum_{l=2}^{L} \lambda_l \mathcal{L}_{HCMI}(G, Q_l)$$

In Expression (8), the terms of "$\lambda_1, \ldots, \lambda_L$" are trade-off parameters. The term "$L_{GAN}(D,G)$" is represented by Expression (9-1). The term "$L_{MI/AC}(G,Q_1)$" represents that either $L_{MI}(G,Q_1)$ represented by Expression (9-2) or $L_{AC}(G,Q_1)$ represented by Expression (9-3) is used. $L_{MI}(G,Q_l)$ is used when an attribute vector is not included in the learning data. $L_{AC}(G,Q_1)$ is used when an attribute vector is included in the learning data. The term "$L_{HCMI}(G,Q_l)$" is represented by Expression (9-4).

[Expression. 9]

$$\mathcal{L}_{GAN}(D, G) = \mathbb{E}_{x \sim P_{data}(x)}[\log D(x)] + \mathbb{E}_{z \sim P_z(z)}[\log(1 - D(G(z)))] \qquad (9\text{-}1)$$

$$\mathcal{L}_{MI}(G, Q_1) = \mathbb{E}_{c_1 \sim P(c_1), x \sim G(\hat{c}_L, z)}[\log Q_1(c_1 \mid x)] \qquad (9\text{-}2)$$

$$\mathcal{L}_{AC}(G, Q_1) = \qquad (9\text{-}3)$$

$$\mathbb{E}_{c_1 \sim P(c_1), x \sim G(\hat{c}_L, z)}[\log Q_1(c_1 \mid x)] + \mathbb{E}_{c_1, x \sim P_{data}(c_1, x)}[\log Q_1(c_1 \mid x)]$$

$$\mathcal{L}_{HCMI}(G, Q_l) = \mathbb{E}_{c \sim P(c|p), x \sim G(\hat{c}_L, z)}[\log Q_l(c \mid x, p)] \qquad (9\text{-}4)$$

The term "$x \sim P_{data}(x)$" in Expressions (9-1) to (9-4) represents that true image data x is sampled from learning data. The term "$z \sim P(z)$" represents that the latent variable z ($z_i, z_a$) is generated from a certain data distribution. The term "$c_1 \sim P(c_1)$" represents that the first-layer attribute vector $c_1$ is generated from a certain data distribution. The term "$x \sim G(\hat{c}_L, z)$" represents that image data is generated by the neural network G as the generator on the basis of a latent variable $\hat{c}_L$ and a latent variable $z(z_i, z_a)$ representing the attributes of the L-th layer. The term "$c_1, x \sim P_{data}(c_1, x)$" represents that the true image data x and the attribute vector $c_1$ corresponding to the image data x are sampled from the learning data. The term "$c \sim P(c|p)$" represents that the latent variable c is sampled in accordance with the distribution of $P(c|p)$. In Expression (9-4), c is a latent variable representing the attributes of the l-th layer and p is a latent variable representing the attributes of the (l-1)-th layer.

Figure 12:
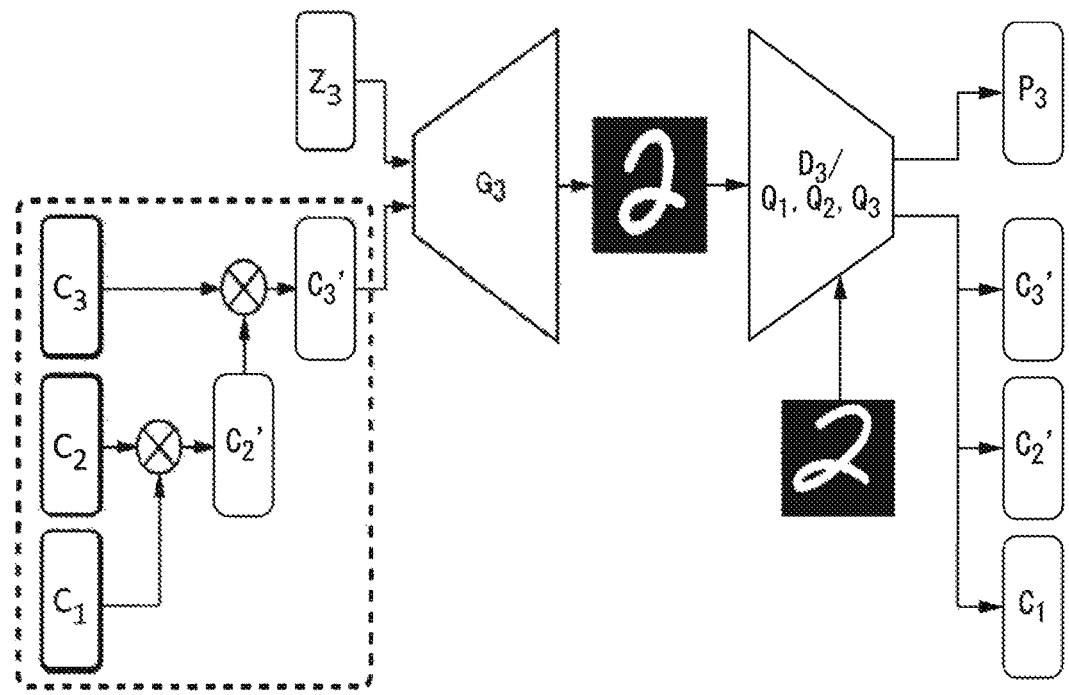
FIG. 12 is a diagram illustrating an example of components included in a learning unit according to the second embodiment.

In the signal generation device of the second embodiment, when the discriminator discriminates whether the generated image data follows the same distribution as the true image data, the learning unit 30 may has one-layer neural network illustrated in FIG. 12 instead of the three-layer neural network illustrated in FIG. 7. When the learning unit 30 has one-layer neural network illustrated in FIG. 12, the learning unit 30 has a neural network $G_3$ operating as the generator, a neural network $D_3$ operating as the discriminator, and neural networks $Q_1$, $Q_2$, and $Q_3$ that estimate a distribution of the latent variables $c_1$, $c_2'$, and $c_3'$ representing the attributes.

In learning of the each neural network, the learning unit 30 fixes the parameters of the other neural network other than one learning target neural network and updates the parameters of the learning target neural network. The learning of each neural network included in the learning unit 30 is repeated for each piece of learning data similarly to the learning described in the first and second embodiments.

When learning of the neural network $Q_1$ is performed, the learning unit 30 updates the parameters of the neural network $Q_1$ on the basis of the latent variables $c_2$ and $c_3$ set to predetermined initial values and latent variables $z_3$ and $c_1$ generated from a certain data distribution. When learning of the neural network $Q_2$ is performed, the learning unit 30 updates the parameters of the neural network $Q_2$ on the basis of a latent variable $c_3$ set to an initial value and latent variables $z_3$, $c_1$, and $c_2$ generated from a certain data distribution. When learning of the neural network $Q_3$ is performed, the learning unit 30 updates the parameters of the neural network $Q_3$ on the basis of the latent variables 73, $c_1$, $c_2$, and $c_3$ generated from a certain data distribution.

The initial values set to the latent variables $c_2$ and $c_3$ representing attributes are determined on the basis of an expectation value or an average value of values that the latent variables $c_2$ and $c_3$ can take, for example. Alternatively, the initial values may be determined on the basis of the number of variables included in the latent variables $c_2$ and $c_3$. Learning of the neural networks $G_3$ and $D_3$ is similar to the learning described in the second embodiment.

The neural network D as the discriminator may discriminate whether image data includes an attribute vector. When the discriminator discriminates whether image data includes an attribute vector, the discriminator may further include a neural network that determines whether input image data includes each attribute.

The signal generation device may apply a known image processing technique for the generated image data. For example, the signal generation device may perform super-resolution processing or image-quality correction on the generated image.

INDUSTRIAL APPLICABILITY

The present invention can be applied to applications where it is necessary to generate various signals while controlling attributes of a signal to be generated.

REFERENCE SIGNS LIST

10: Input unit
20: Arithmetic unit
28: Learning variable generation unit
30: Learning unit
40: Neural network storage unit
52: Signal-generation-variable generation unit
56: Signal generation unit
90: Output unit
100: Signal generation device

The invention claimed is:

1. A signal generation device comprising:
a memory; and
a processor connected to the memory, the processor being configured to:
generate a plurality of latent variables corresponding to a plurality of features of a signal, the plurality of latent variables including a latent variable representing an attribute and a latent variable representing an identity; and
generate the signal to be generated by using at least one neural network, the generation of the signal being performed based on the latent variable representing the attribute, the latent variable representing the identity, and the at least one neural network learned in advance,
wherein a given latent variable representing the attribute is converted by another latent variable, such that the another latent variable is from a layer different than a layer to which the given latent variable belongs and the another latent variable represents the attribute.

2. The signal generation device according to claim 1, wherein
a part of the plurality of latent variables includes latent variables for each of the attributes.

3. The signal generation device according to claim 1, wherein
the processor has a plurality of layers that generates the signal to be generated,
the processor has a neural network provided in each of the plurality of layers as the at least one neural network,
a first latent variable representing attributes of a first layer of the plurality of layers is an attribute vector,
a second latent variable representing attributes of each of second and subsequent layers of the plurality of layers is obtained by converting a part of the plurality of latent variables on a basis of a particular latent variable representing attributes of a shallower layer, and
the processor inputs the latent variable representing attributes of each of the plurality of layers to the respective neural network and generates the signal to be generated using the respective neural networks.

4. The signal generation device according to claim 1, wherein
the processor generates the plurality of latent variables using random numbers.

5. The signal generation device according to claim 1, wherein
the processor generates a first latent variable and a second latent variable as the plurality of latent variables, the first latent variable representing a feature corresponding to the identity among the plurality of features of the signal, and the second latent variable being independent of the first latent variable and representing features corresponding to the attributes among the plurality of features of the signal, and
the at least one neural network receives, as input, the first latent variable and a result of converting the second latent variable by an attribute vector representing attributes of the signal to be generated and generates the signal.

6. The signal generation device according to claim 1, wherein the at least one neural network includes a first neural network as a generator and a second neural network as a discriminator,
the first neural network generates the signal on the basis of a first latent variable and one of a second latent variable and a third latent variable, the first latent variable representing a feature corresponding to the identity among the plurality of features of the signal, the second latent variable being independent of the first latent variable and representing features corresponding to the attributes among the plurality of features of the signal, and the third latent variable obtained by converting the second latent variable by an attribute vector,
the second neural network discriminates whether the signal generated by the first neural network follows a same distribution as a true signal, and
the first and second neural networks have learned in accordance with competitive optimization conditions.

7. A non-transitory computer-readable medium storing a program for causing a computer to function as the signal generation device according to claim 1.

8. The signal generation device according to claim 1, wherein
the at least one neural network includes a first neural network as a generator and a second neural network as a discriminator,
the first neural network generates the signal based on the plurality of latent variables representing attributes,
the second neural network discriminates whether or not the signal generated by the first neural network follows a same distribution as a true signal, and
the first and second neural networks are learned according to optimization conditions competitive with each other.

9. The signal generation device according to claim 1, wherein the at least one neural network includes:
a first neural network as a generator of an N+1 layer, where N is an integer; and
a second neural network as a discriminator of the N+1th layer;
wherein the first neural network is configured to generate a signal of the N+1th layer based on a first latent variable based on a second latent variable representing an attribute of the Nth layer and a third latent variable representing the attribute of the N+1th layer, and a fourth latent variable representing an identity of the N+1th layer, wherein the second neural network is configured to discriminate whether or not the signal of the N+1th layer generated by the first neural network follows a same distribution as a true signal, and wherein the first and second neural networks learn according to competitive optimization conditions.

10. The signal generation device according to claim 9, wherein the at least one neural network further includes:
a third neural network as a generator of an N+2th layer; and
a fourth neural network as a discriminator of the N+2th layer;

wherein the third neural network is configured to generate a signal of the N+2th layer based on
a fifth latent variable based on the first latent variable and a sixth latent variable representing the attribute of the N+2th layer, and
a seventh latent variable representing the identity of the N+2th layer, wherein the fourth neural network is configured to discriminate whether or not the signal of the N+2th layer generated by the third neural network follows the same distribution as the true signal, and wherein the third and fourth neural networks learn according to the competitive optimization conditions.

11. The signal generation device according to claim 1, wherein the at least one neural network further includes:
a first neural network; and
a second neural network, wherein the first neural network is configured to generate
a signal based on
a first latent variable based on
a second latent variable based on third and fourth latent variables representing the attribute, and
a fifth latent variable representing the attribute,
a six latent variable representing the identity, wherein the second neural network is configured to discriminate whether or not the signal generated by the first neural network follows a same distribution as a true signal, and wherein the first and second neural networks learn according to competitive optimization conditions.

12. A signal generation learning device comprising:
a memory; and
a processor connected to the memory, the processor being configured to:
generate a plurality of latent variables representing features of a signal, the plurality of latent variables including a latent variable representing an attribute and a latent variable representing an identity; and
make first and second neural networks learn according to optimization conditions competitive with each other, the first neural network being a generator that generates the signal based on learning data including a true signal, the latent variable representing the attribute and the latent variable representing the identity, the second neural network being a discriminator that discriminates whether or not the signal to be generated by the generator follows a same distribution as the true signal, wherein the plurality of latent variables includes a given latent variable representing the attribute among the features of the signal, the given latent variable representing the attribute being independent from another latent variable representing the identity, the processor makes the first and second neural networks learn according to the optimization conditions competitive with each other by providing, to the first neural network, the given latent variable representing the attribute and the another latent variable representing the identity, and by providing, to the second neural network, the signal to be generated by the first neural network and the true signal, and wherein the given latent variable representing the attribute is converted by another latent variable representing the attribute, such that the another latent variable representing the attribute is from a layer different than a layer to which the given latent variable belongs.

13. The signal generation learning device according to claim 12, wherein
the processor generates the plurality of latent variables including a first latent variable and a second latent variable, the first latent variable representing a feature corresponding to the identity among the features of the signal, the second latent variable being independent of the first latent variable and representing features corresponding to attributes among the features of the signal,
the learning data includes the true signal,
the learning processor provides the first neural network with the first latent variable and a result of converting the second latent variable by an attribute vector corresponding to the signal and provides the second neural network with a second signal generated by the first neural network and the true signal and causes the first and second neural networks to learn in accordance with the optimization conditions.

14. A signal generation method comprising:
generating a plurality of latent variables corresponding to a plurality of features of a signal, the plurality of latent variables including a latent variable representing an attribute and a latent variable representing an identity; and
generating the signal to be generated by using at least one neural network, the generation of the signal being performed based on the latent variable representing the attribute, the latent variable representing the identity, and the at least one neural network learned in advance,
wherein a given latent variable representing the attribute is converted by another latent variable, such that the another latent variable is from a layer different than a layer to which the given latent variable belongs and the another latent variable represents the attribute.

15. The signal generation method according to claim 14, wherein
the at least one neural network includes a first neural network as a generator and a second neural network as a discriminator,
the first neural network generates the signal based on the plurality of latent variables representing attributes,
the second neural network discriminates whether or not the signal generated by the first neural network follows a same distribution as a true signal, and
the first and second neural networks are learned according to optimization conditions competitive with each other.

16. A signal generation learning method comprising:
generating a plurality of latent variables representing features of a signal, the plurality of latent variables including a latent variable representing an attribute and a latent variable representing an identity; and
making first and second neural networks learn according to optimization conditions competitive with each other, the first neural network being a generator that generates the signal based on learning data including a true signal, the latent variable representing the attribute and the latent variable representing the identity, the second neural network being a discriminator that discriminates whether or not the signal to be generated by the generator follows a same distribution as the true signal, wherein
the plurality of latent variables includes a given latent variable representing the attribute among the features of the signal are generated, the given latent variable representing the attribute being independent from another latent variable representing the identity,
the first and second neural networks learn according to the optimization conditions competitive with each other by providing, to the first neural network, the given latent variable representing the attribute and the another latent variable representing the identity, and by providing, to the second neural network, the signal to be generated by the first neural network and the true signal, and
wherein the given latent variable representing the attribute is converted by another latent variable representing the attribute, such that the another latent variable representing the attribute is from a layer different than a layer to which the given latent variable belongs.

* * * * *